(12) United States Patent
Romano

(10) Patent No.: US 8,434,379 B2
(45) Date of Patent: May 7, 2013

(54) APPARATUS WITH ROTATING ECCENTRIC MASSES FOR DEVELOPING UNIDIRECTIONAL INERTIAL FORCES

(76) Inventor: Antonio Romano, Aradeo (IT)

( * ) Notice: Subject to any disclaimer, the term of this patent is extended or adjusted under 35 U.S.C. 154(b) by 422 days.

(21) Appl. No.: 12/374,102

(22) PCT Filed: Jul. 18, 2007

(86) PCT No.: PCT/IT2007/000508
§ 371 (c)(1),
(2), (4) Date: Jan. 16, 2009

(87) PCT Pub. No.: WO2008/010257
PCT Pub. Date: Jan. 24, 2008

(65) Prior Publication Data
US 2009/0308201 A1    Dec. 17, 2009

(30) Foreign Application Priority Data
Jul. 18, 2006    (IT) .............................. RM2006A0373

(51) Int. Cl.
*F16H 33/20* (2006.01)
(52) U.S. Cl.
USPC .......................................................... 74/84 S
(58) Field of Classification Search .................. 74/84 R, 74/84 S
See application file for complete search history.

(56) References Cited

U.S. PATENT DOCUMENTS

| | | | | |
|---|---|---|---|---|
| 4,712,439 A | * | 12/1987 | North ............................. | 74/84 R |
| 4,788,882 A | * | 12/1988 | Fulop ........................... | 74/570.2 |
| 5,167,163 A | * | 12/1992 | McMahon ...................... | 74/84 S |
| 2003/0066382 A1 | * | 4/2003 | Love ............................ | 74/573 R |
| 2004/0103729 A1 | * | 6/2004 | Strickler et al. ............... | 74/84 S |
| 2007/0012124 A1 | * | 1/2007 | Perez ............................ | 74/84 S |

FOREIGN PATENT DOCUMENTS

| | | |
|---|---|---|
| CA | 2203937 | 10/1998 |
| DE | 2610646 | 9/1977 |
| DE | 9109269 | 9/1991 |
| DE | 4029799 | 3/1992 |
| DE | 4312188 | 10/1994 |
| DE | 10361093 | 7/2004 |
| EP | 1213477 | 6/2002 |
| FR | 933483 | 4/1948 |
| FR | 1486488 | 6/1967 |
| GB | 1412146 | 10/1975 |

OTHER PUBLICATIONS

International Search Report dated Jan. 28, 2008, in PCT application.

\* cited by examiner

*Primary Examiner* — Phillip A Johnson
(74) *Attorney, Agent, or Firm* — Young & Thompson

(57) ABSTRACT

An apparatus for developing inertial forces, the resultant of which is a unidirectional force, includes at least two masses (M) or pairs thereof, each rotating on a generic plane along a closed path, the path included between minimum and maximum paths, both included in an outer circumference (C1) having a radius (R1) and a diameter (D1) perpendicular to the symmetry axis of the path of (M), as well as a center (O) coinciding with the rotational center of (M). The minimum path is defined by a circumference (C3) having a radius (R3) equal to $\frac{1}{10}$ of (R1), and a center (O'), set on the axis of symmetry of the path of the masses and tangential to the center of (C1). The maximum path is defined by two minor circumferences of radius $(R_K) \leq \frac{3}{4}$ (R1), each having its own center on the diameter (D1) of (C1) and being tangential thereto.

20 Claims, 30 Drawing Sheets

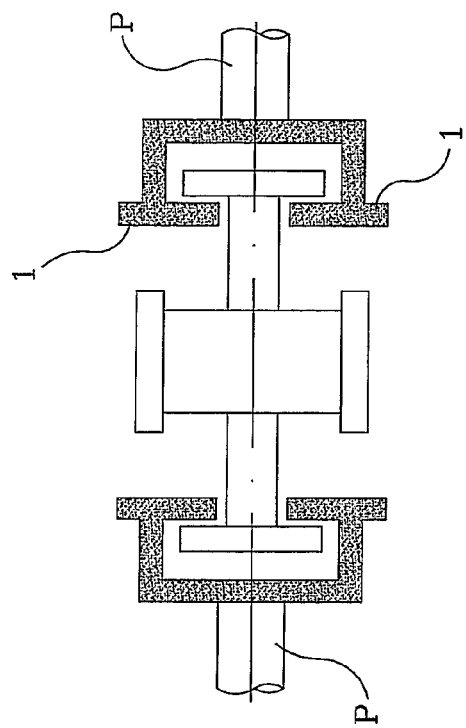
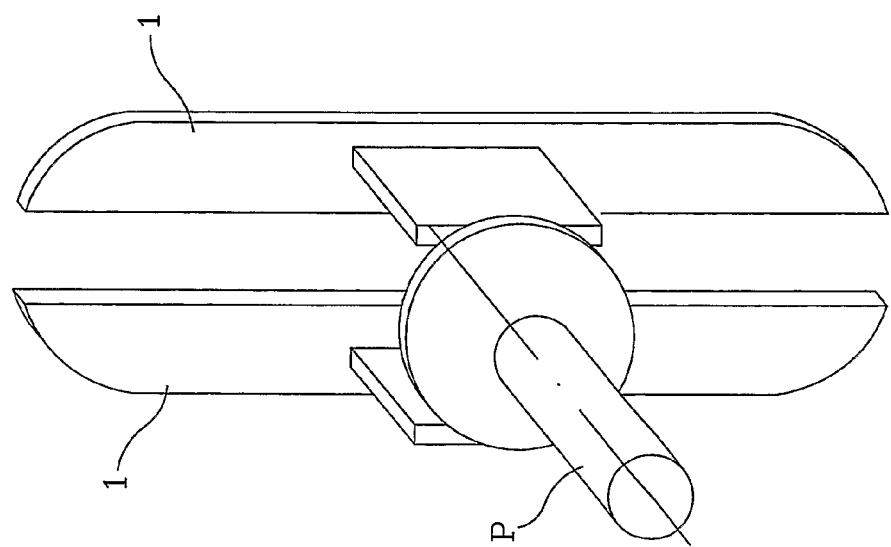
FIG. 33B
FIG. 33A

APPARATUS WITH ROTATING ECCENTRIC MASSES FOR DEVELOPING UNIDIRECTIONAL INERTIAL FORCES

The present invention relates to the mechanical sector, and in particular to an apparatus designed to generate unidirectional forces, exploiting the movement of masses that are set in rotation along paths of appropriate shape.

Current means of locomotion exploit different types of forces for generating the movement, but in any case an interaction with the means in which the vehicle itself moves is necessary: land vehicles usually exploit the friction between the wheels and the terrain on which they move, watercraft and aircraft "push", respectively, a certain mass of water or of air in the direction opposite to the direction in which they are to move. In a vacuum, to obtain a similar result, rockets are used that expel gas at high speed.

The main purpose of the present invention is to apply a thrust to a vehicle by using inertial forces that are purposely generated by masses set in motion along paths, the distance of which is variable with respect to a single axis of rotation.

The above purpose has been achieved, according to the invention, by providing at least one device comprising two pairs of rotating masses that are equal to one another, in which the masses of each pair travel along a plane and closed path, which is parallel and adjacent to that of the other pair that moves in the opposite direction. Said identical paths have at least one axis of symmetry passing through the centre of rotation of the masses, and have in common with each of their own tangents just a single point of tangency.

A better understanding of the invention will be obtained from the ensuing detailed description, with reference to the attached plates of drawings, which illustrate, purely by way of example, some preferred embodiments thereof.

In the drawings:

FIGS. 1 to 10A each show a different path of rotation of rotating masses and the corresponding resultant force generated thereby;

Figures 12, 13, 14:
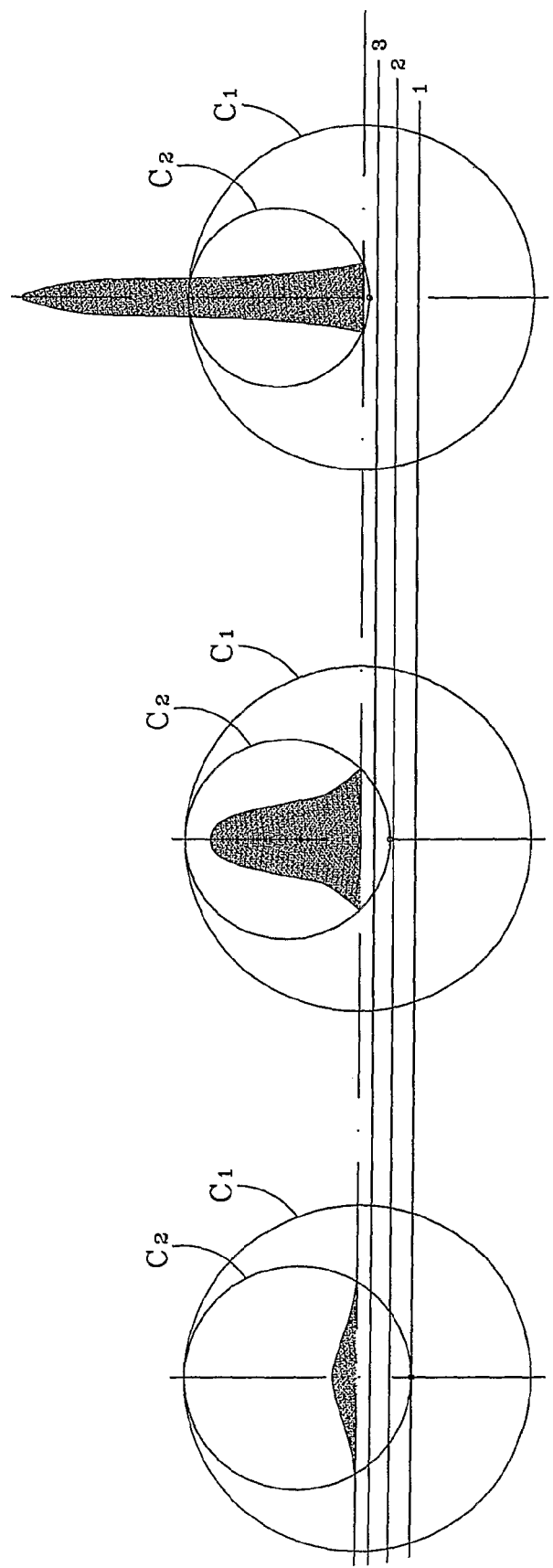
Figure 15:
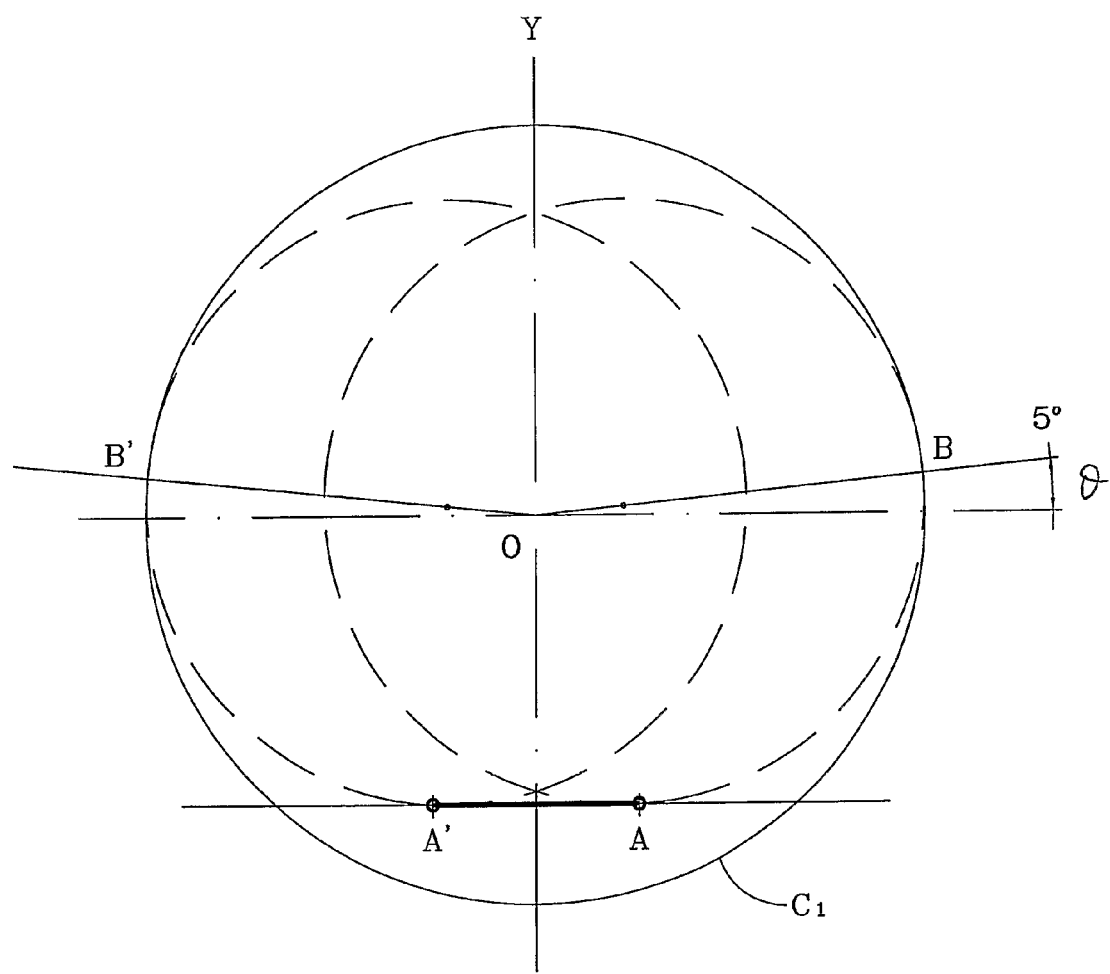
Figure 16:
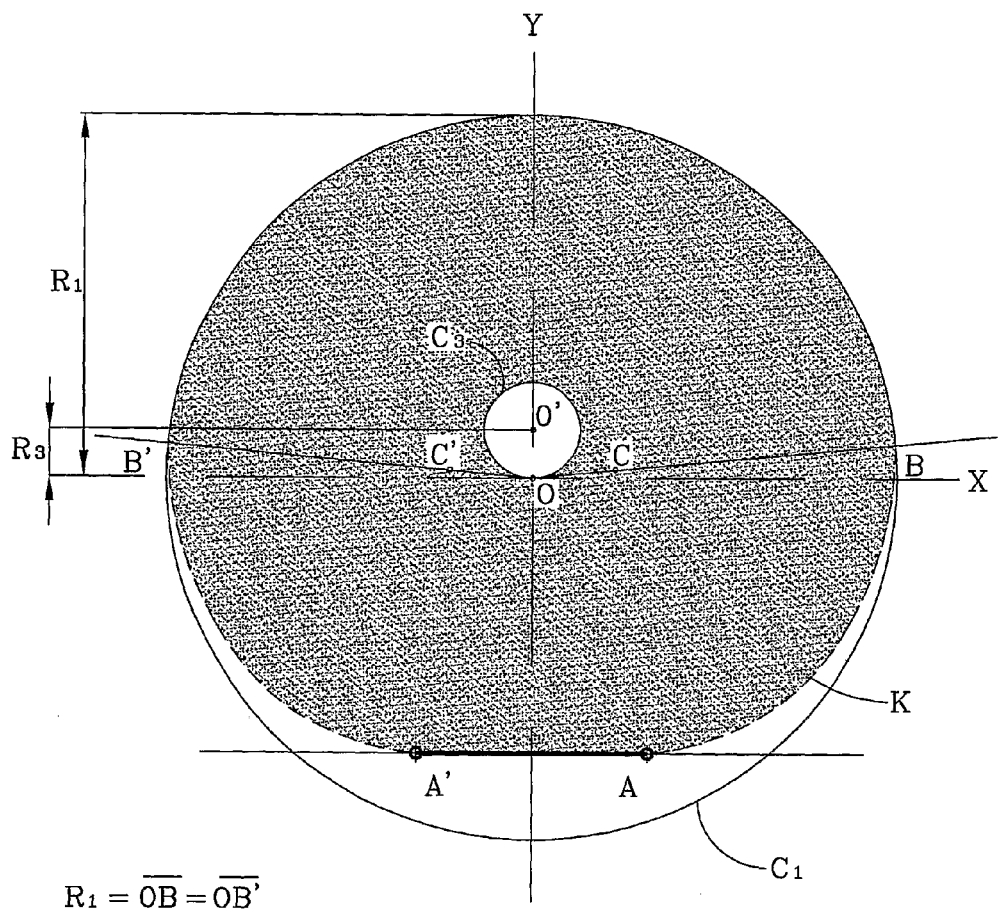
Figure 17:
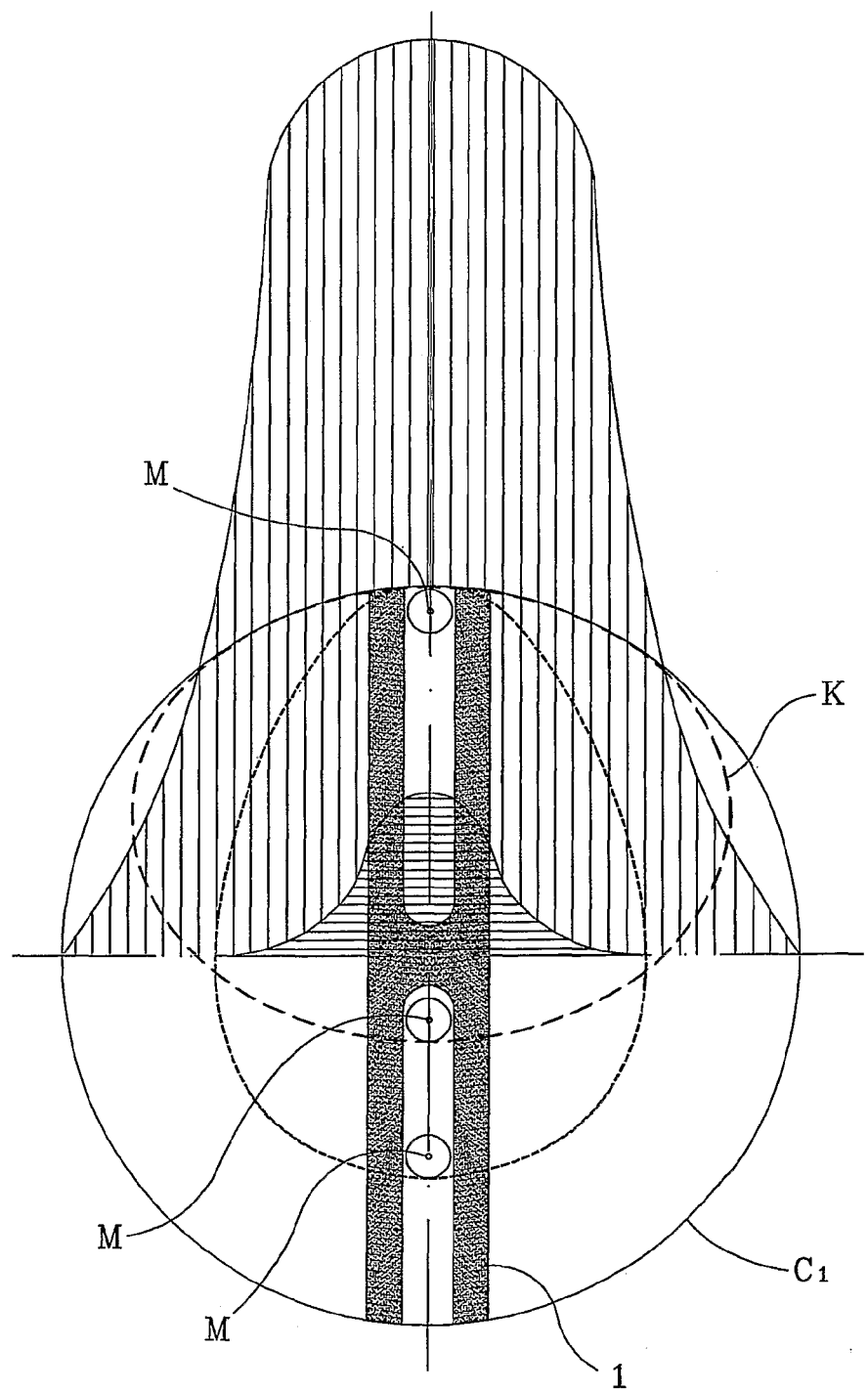
Figure 18A:
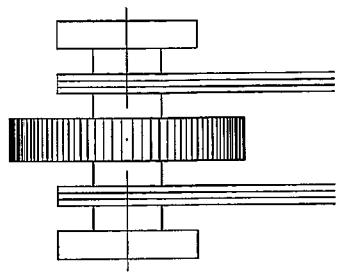
Figure 18B:
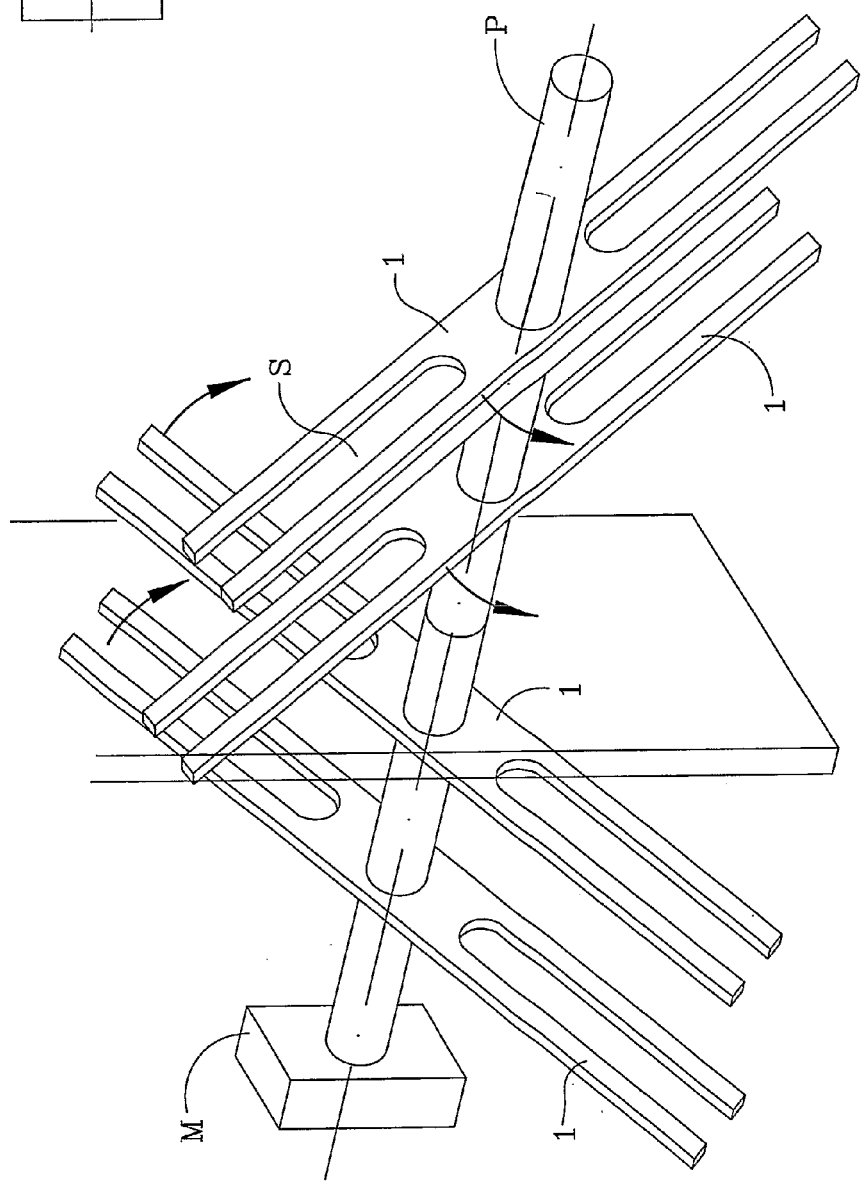
Figure 18C:
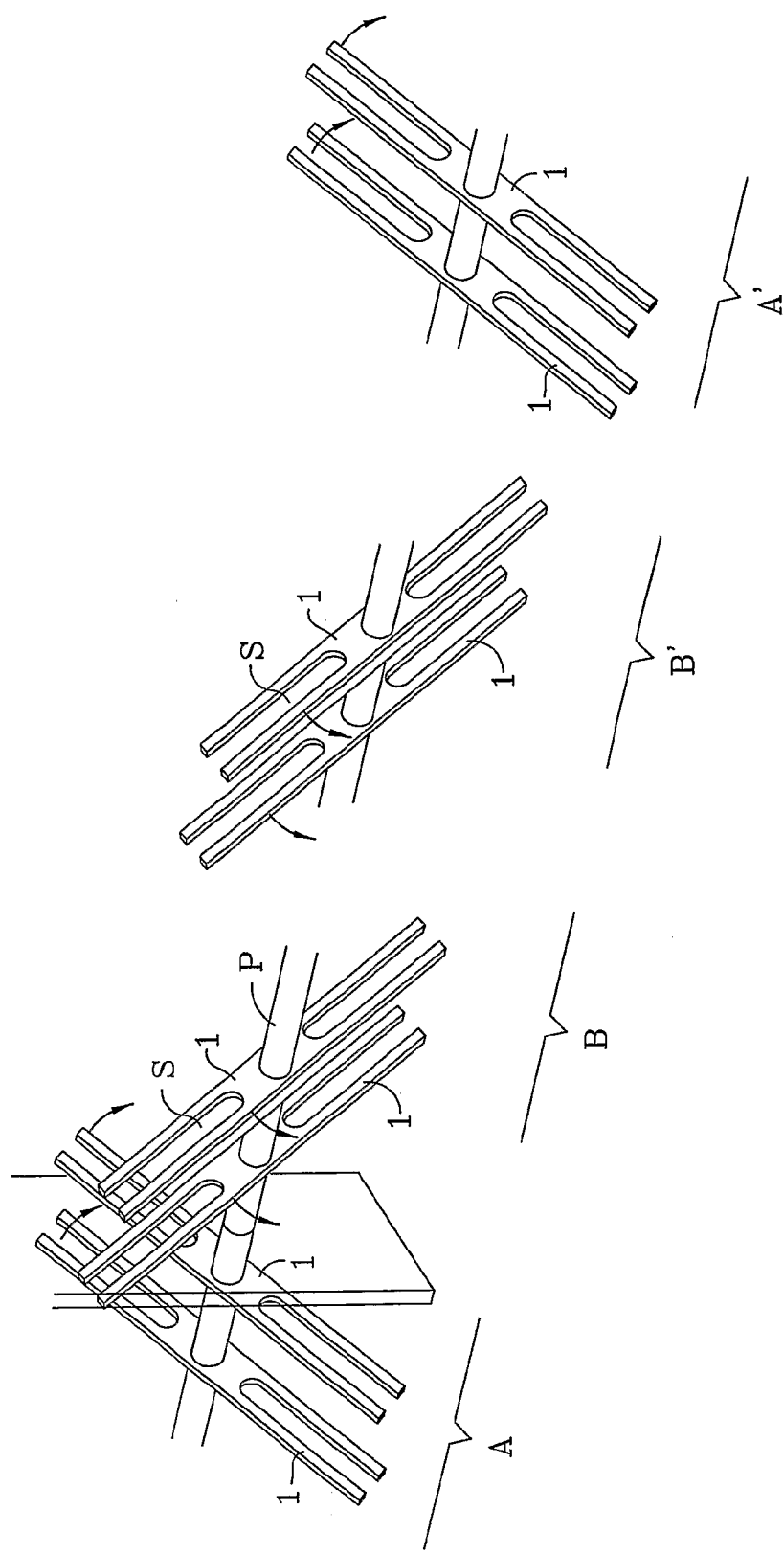
Figure 18D:
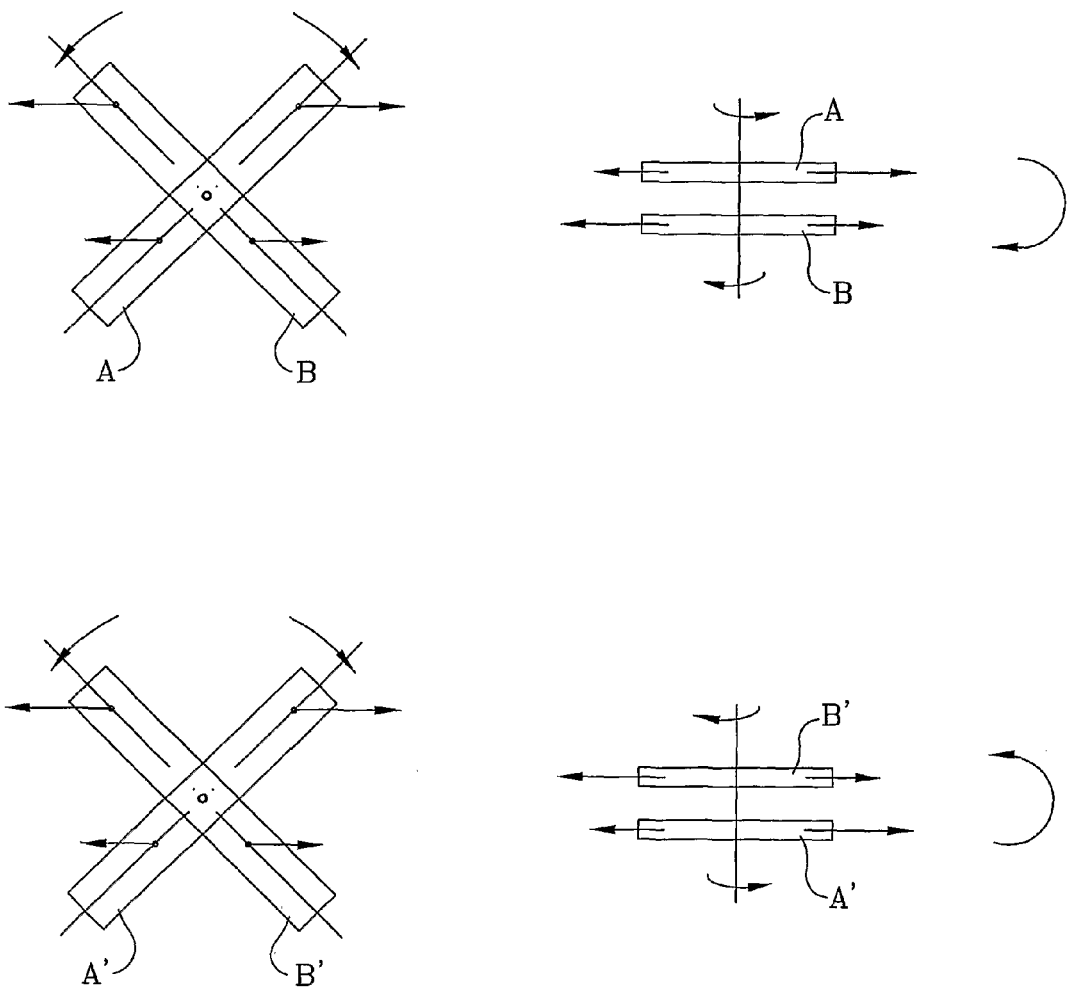
Figure 18E:
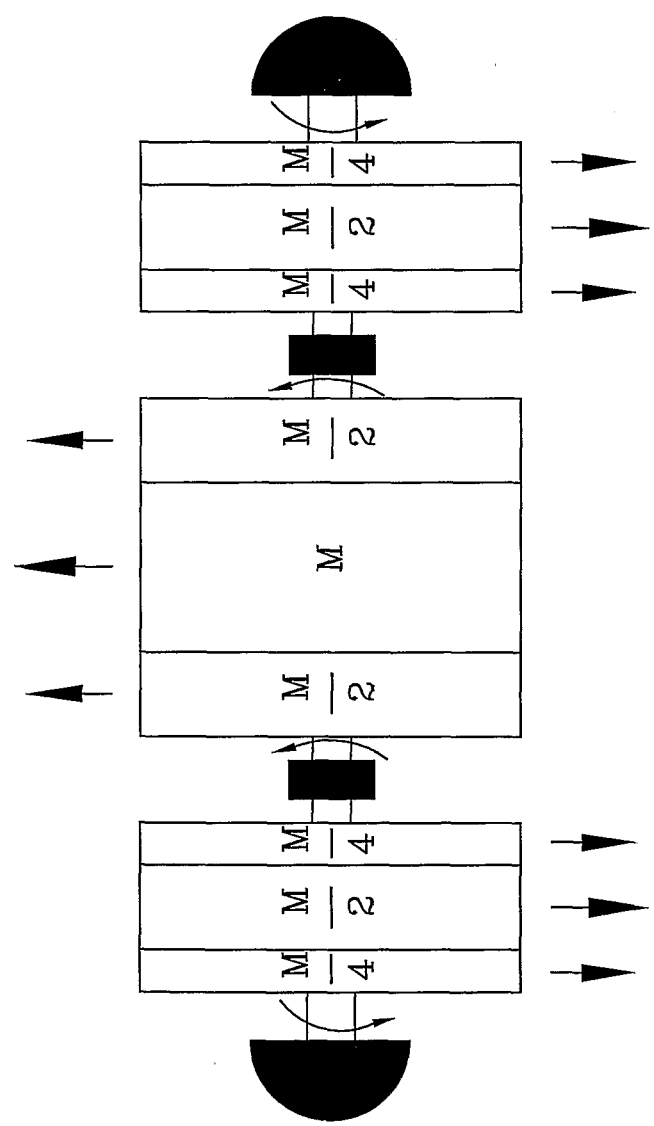
Figure 19:
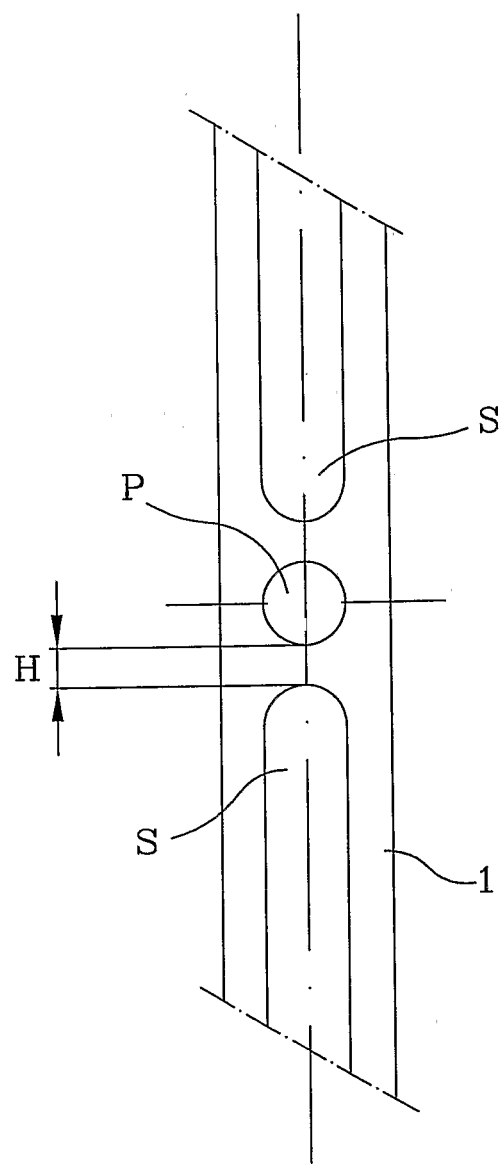
Figure 20:
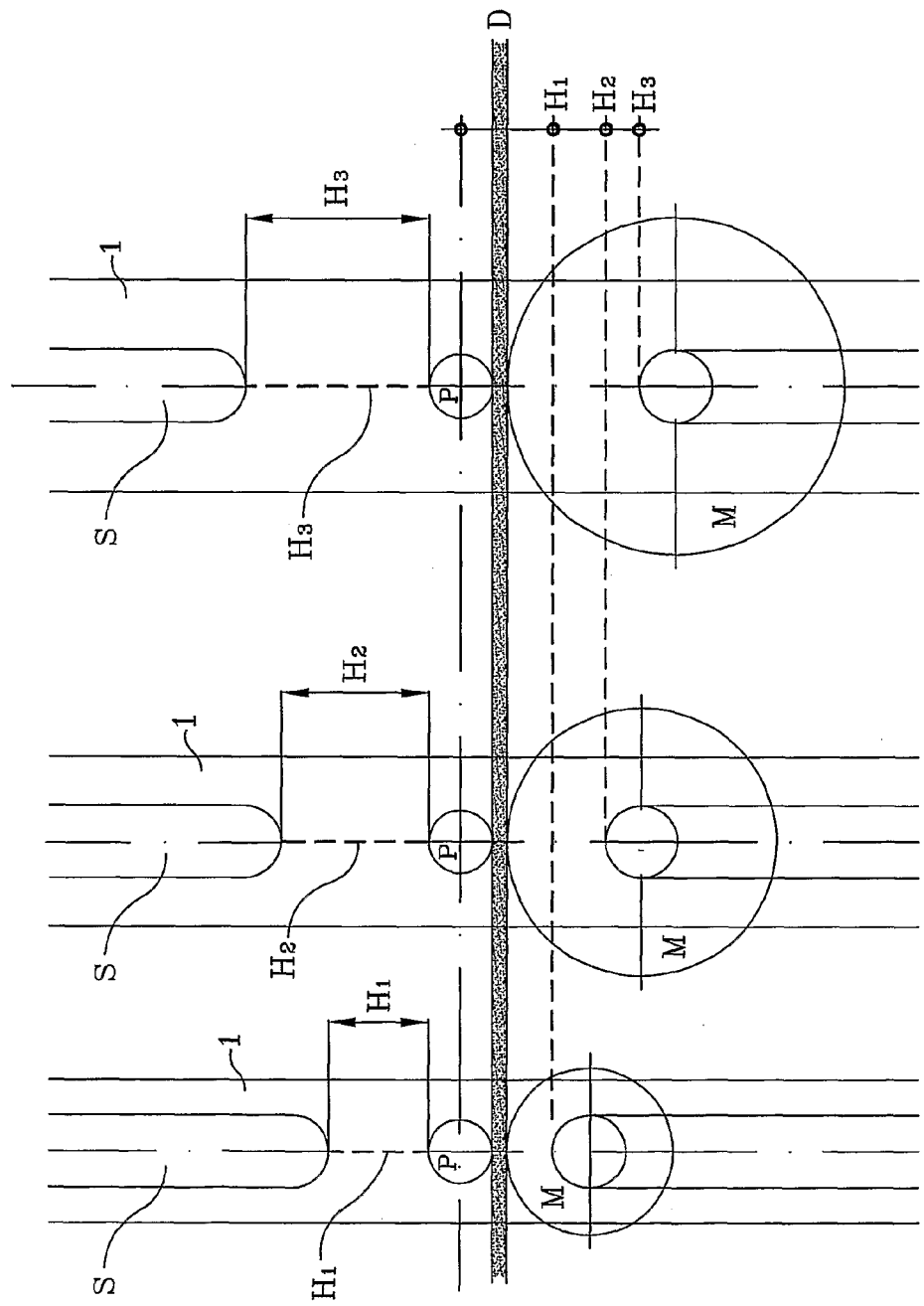
Figure 21:
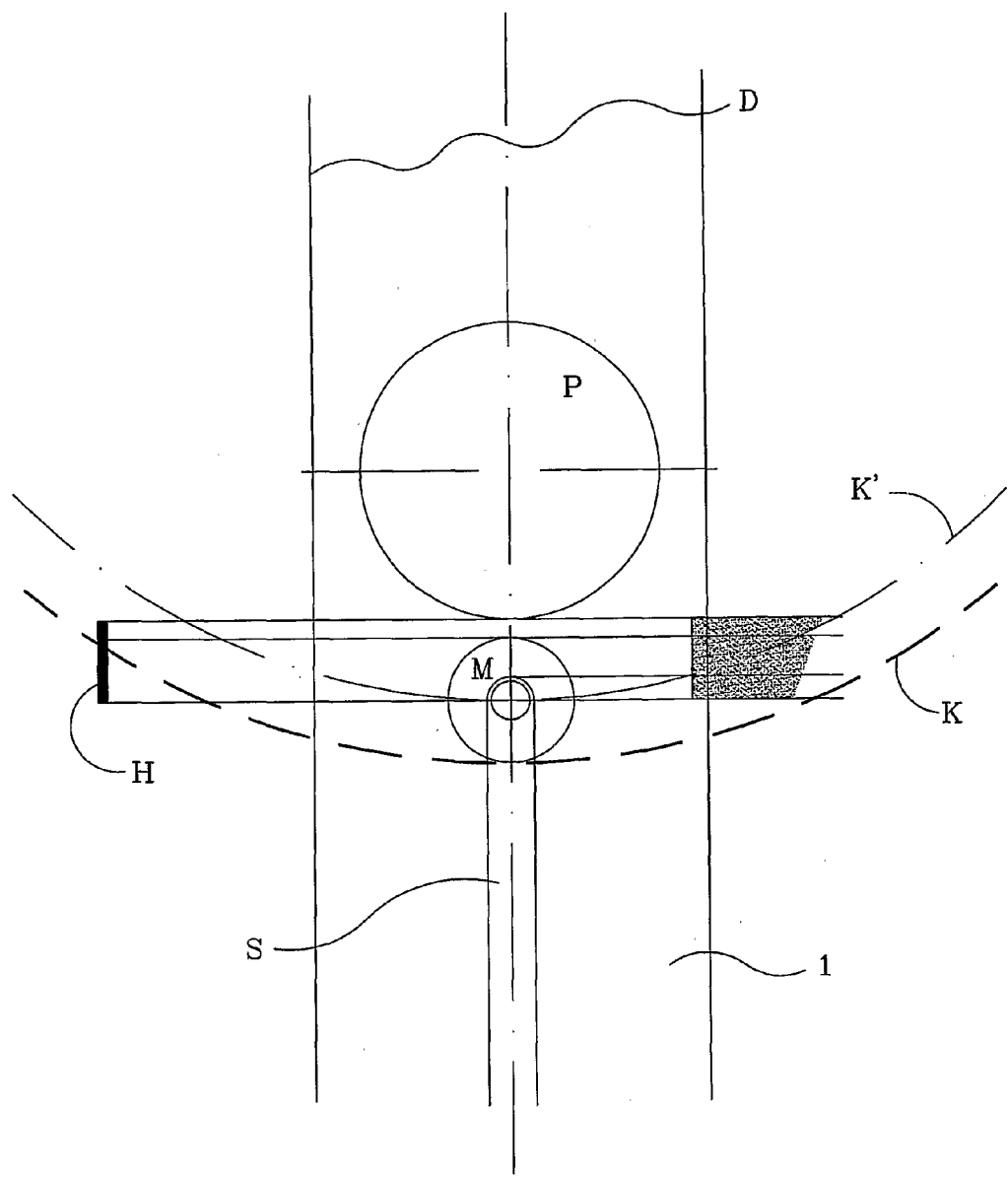
Figure 22:
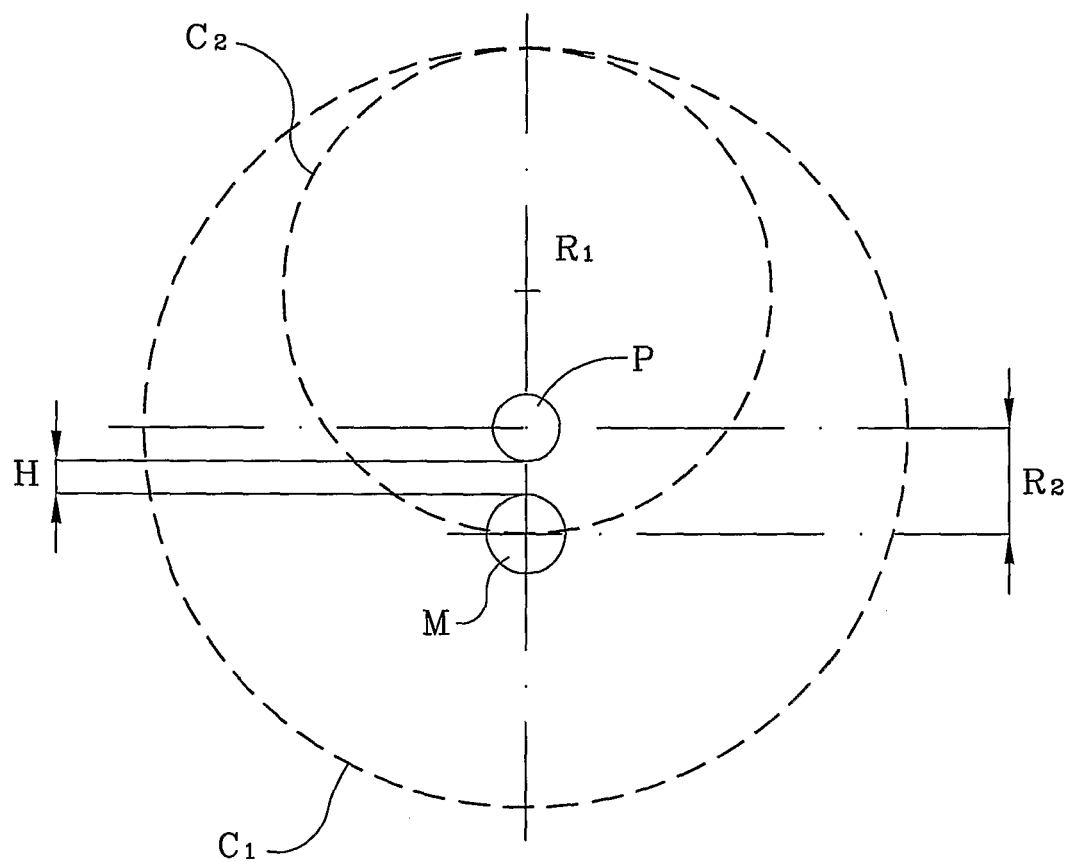
Figure 23A:
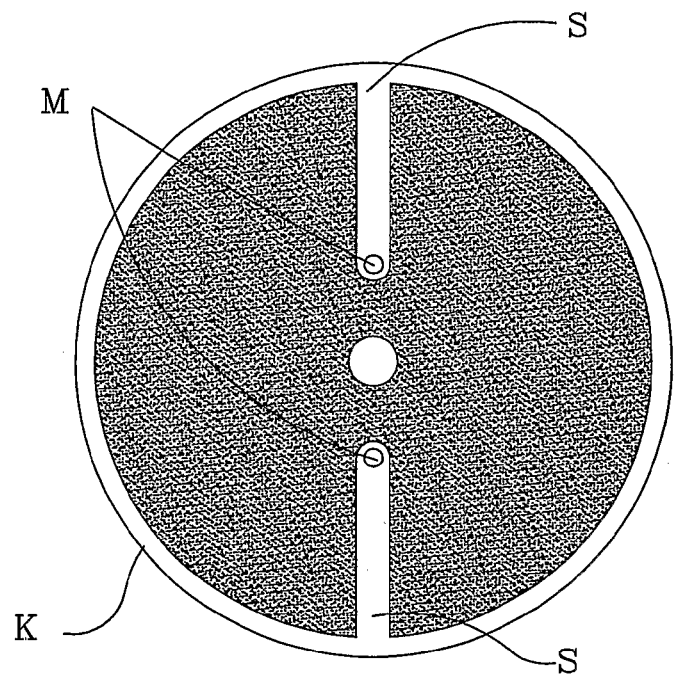
Figure 23B:
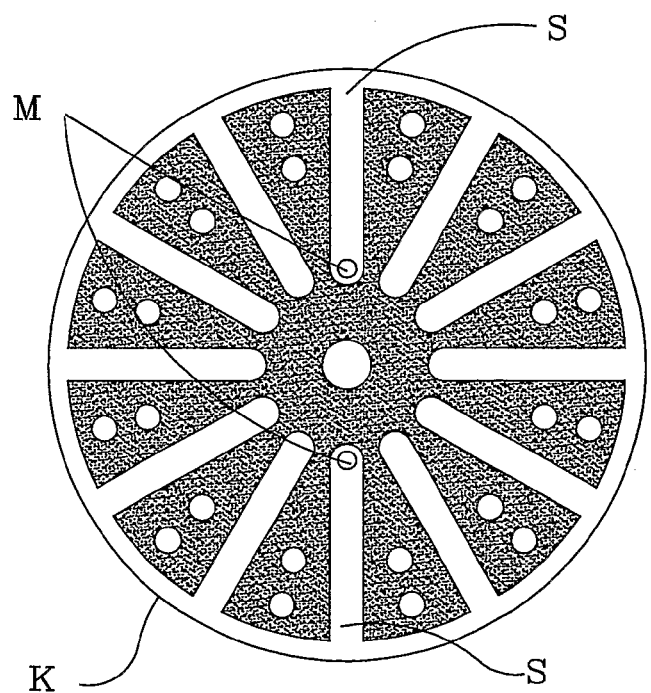
Figure 24:
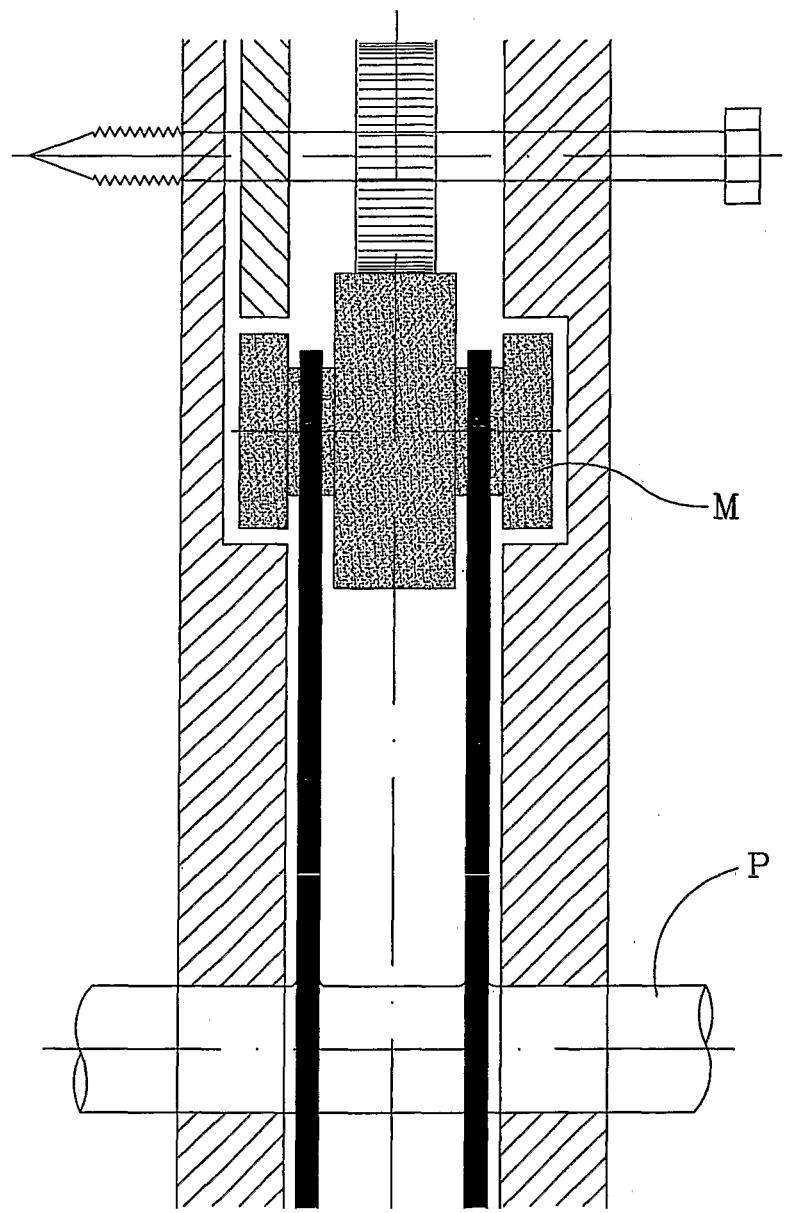
Figure 25:
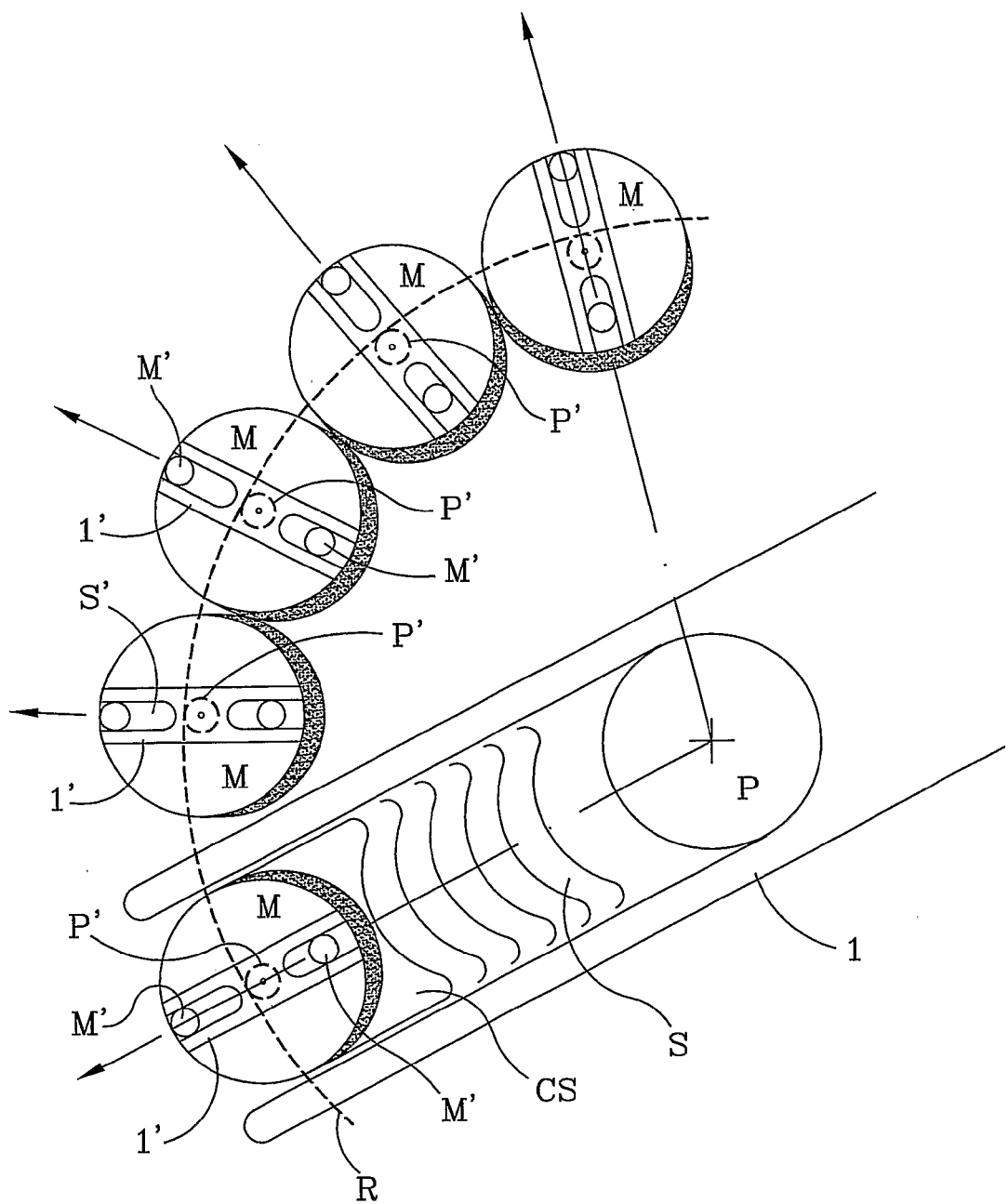
Figure 27:
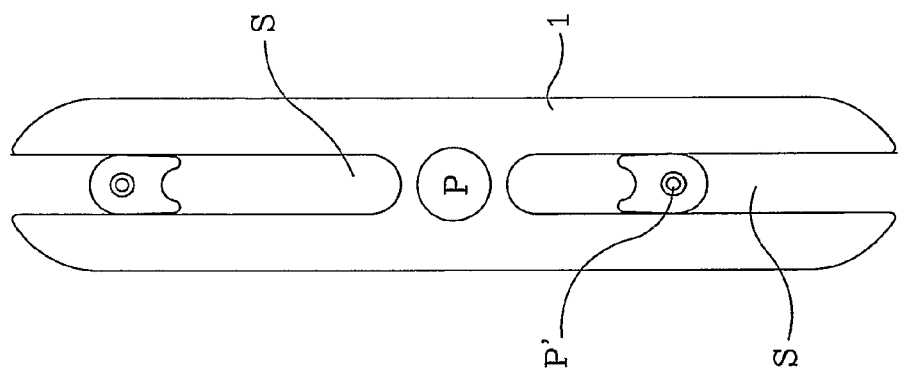
Figure 28:
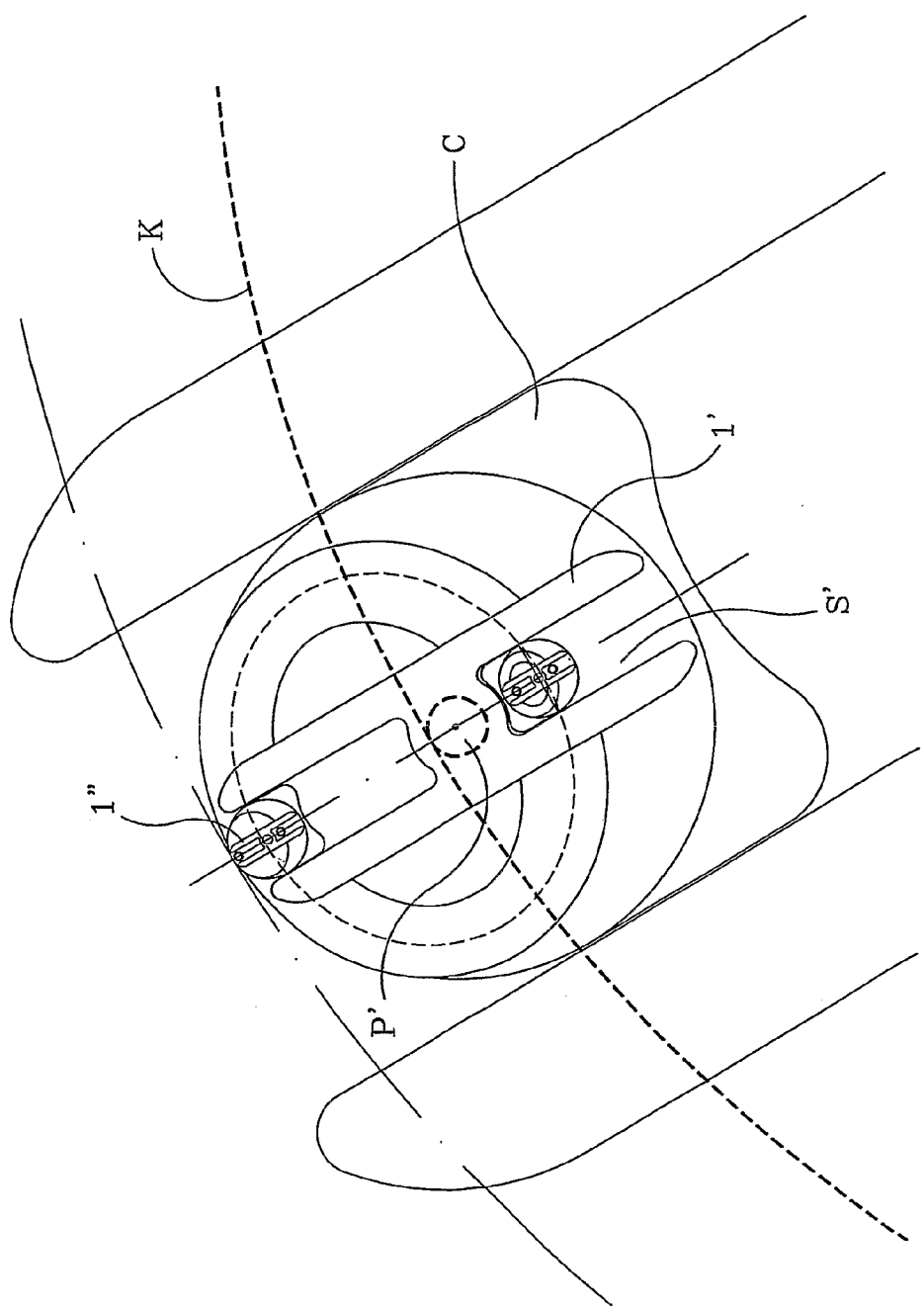
Figure 29:
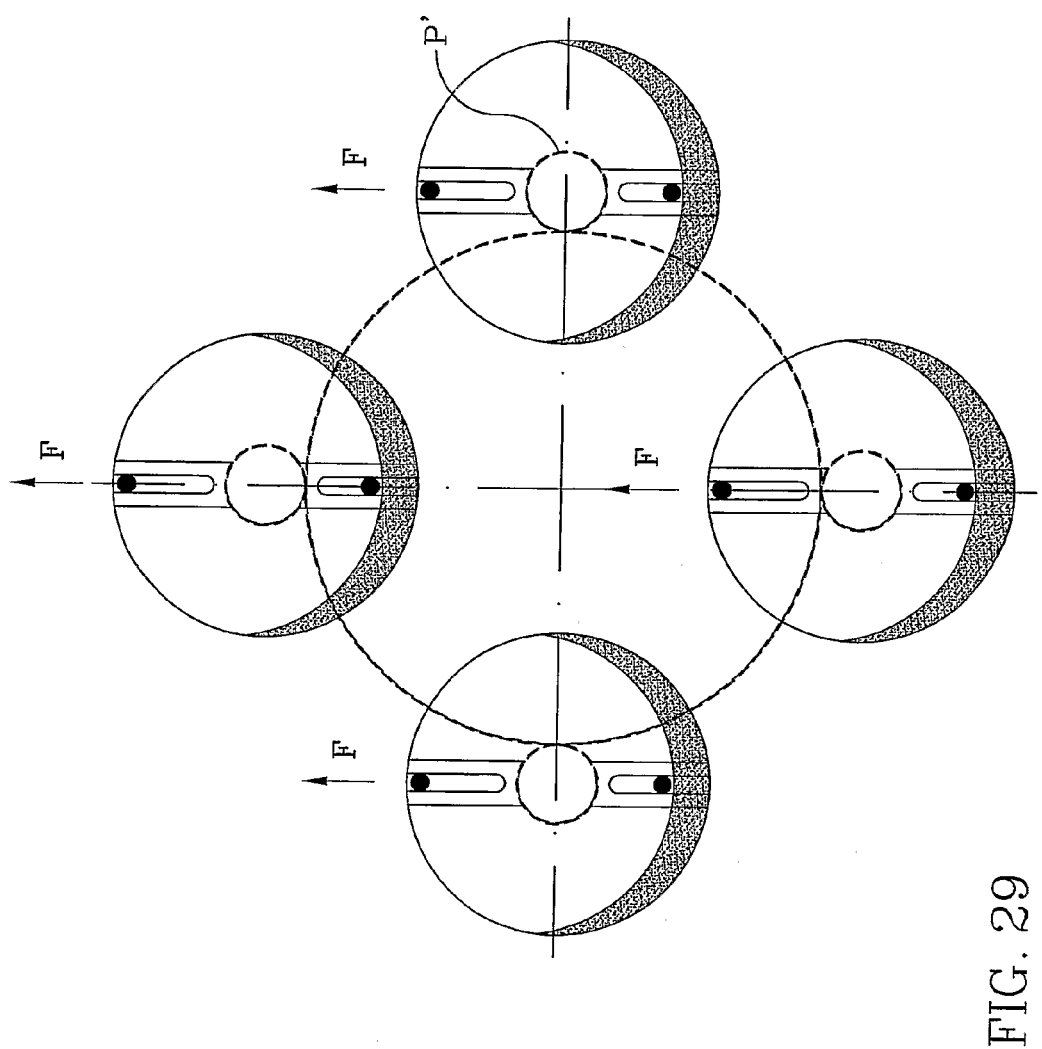
Figure 30:
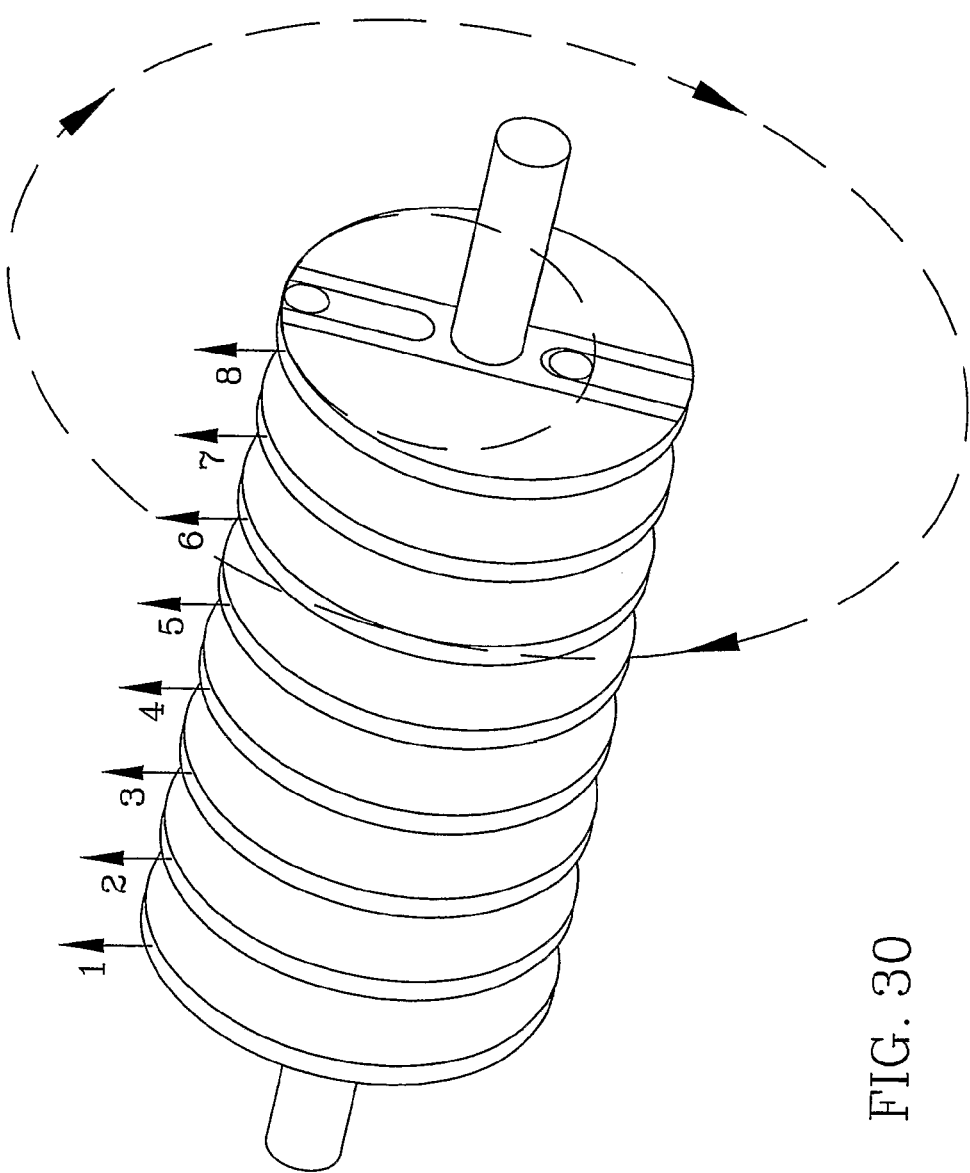
Figure 31:
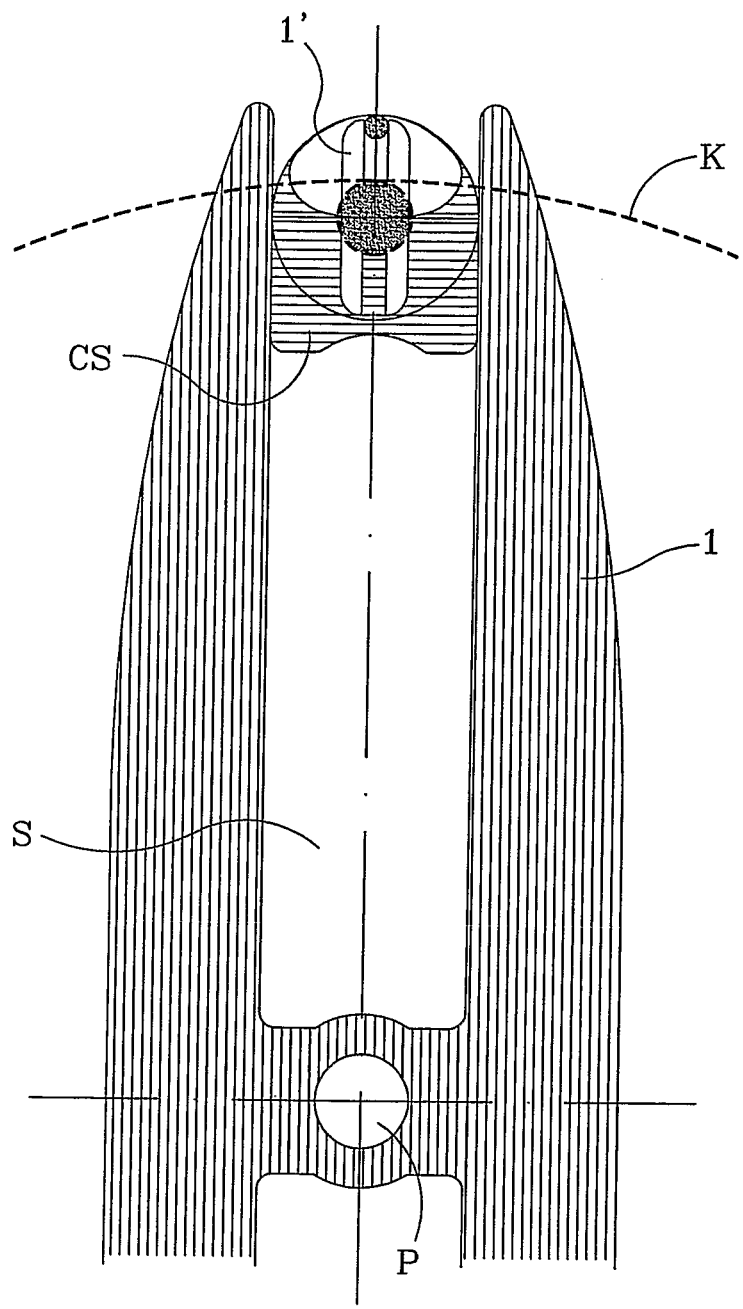
Figure 32A:
Figure 32B:
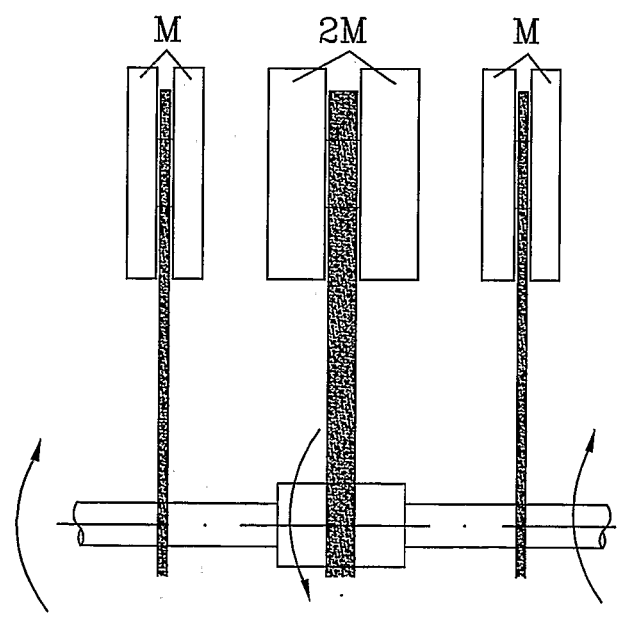
Figure 33C:
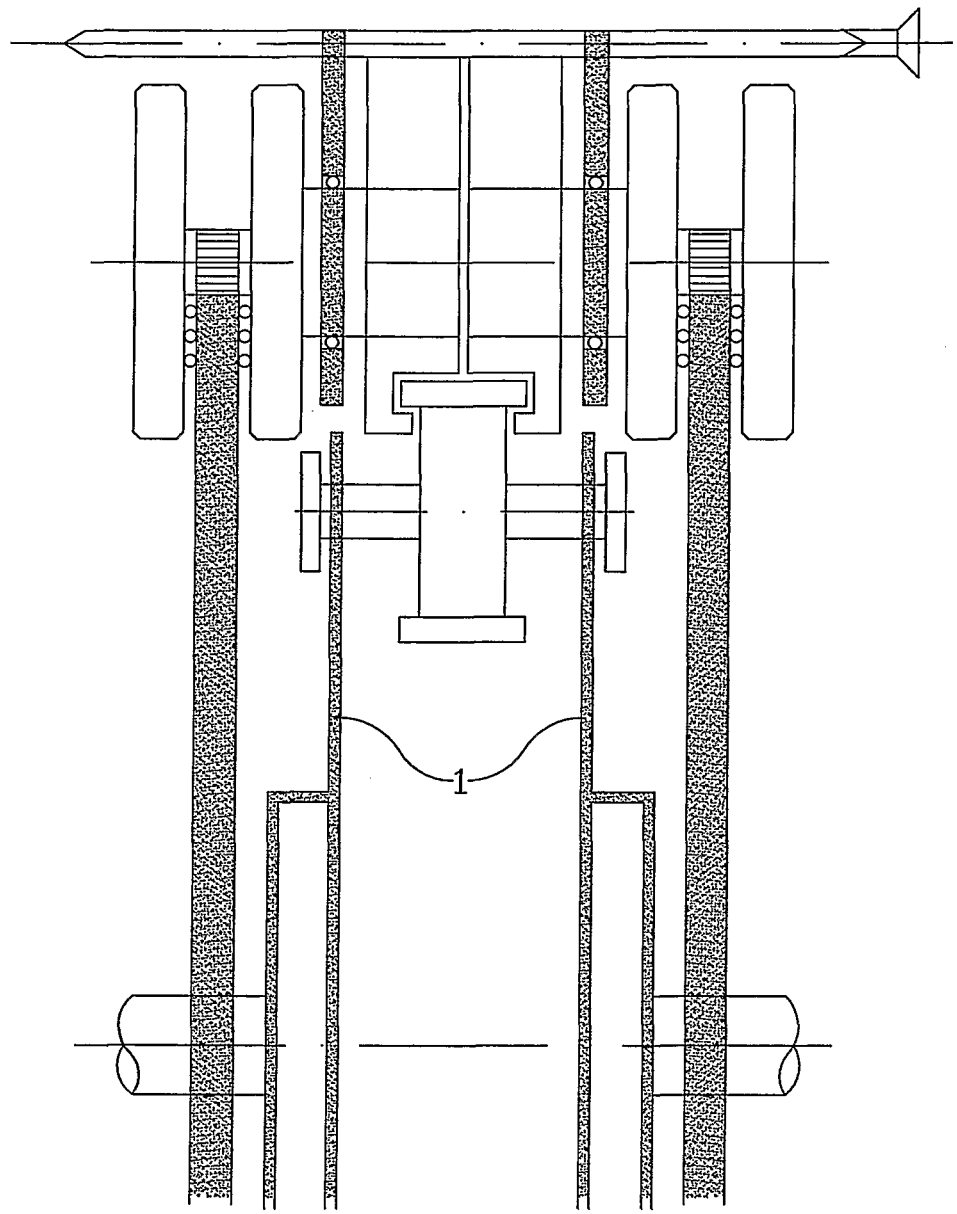
Figure 34A:
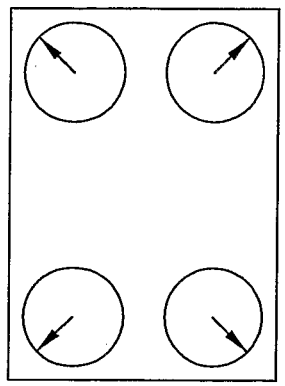
Figure 34B:
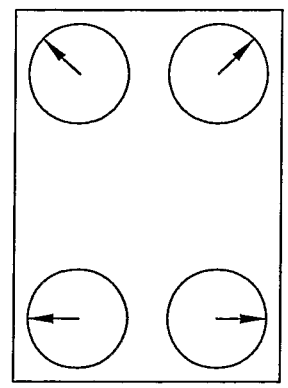
Figure 34C:
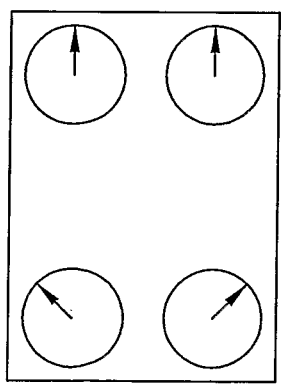
Figure 34D:
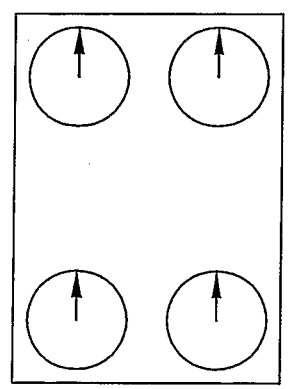
Figure 35A:
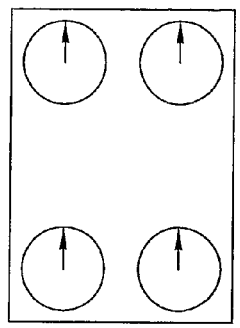
Figure 35B:
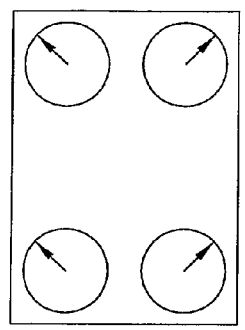
Figure 35C:
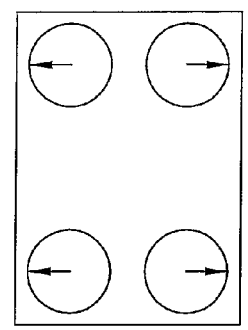
Figure 35D:
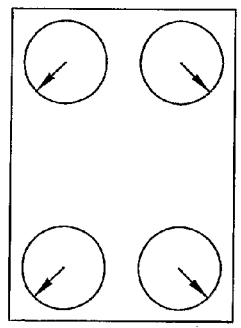
Figure 35E:
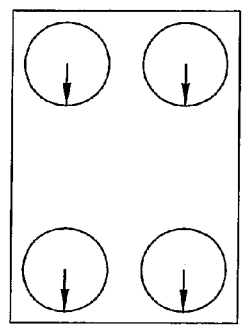
Figure 35F:
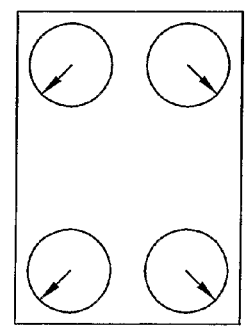
Figure 35G:
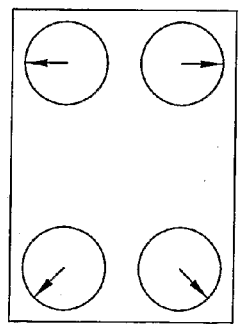
Figure 35H:
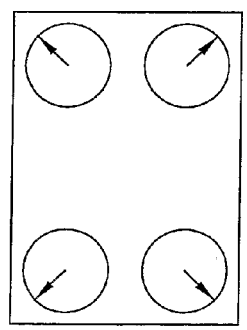
Figure 36A:
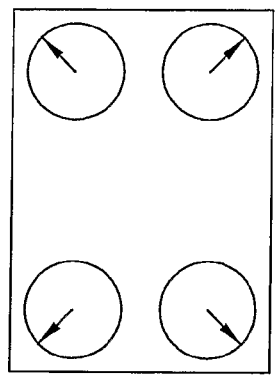
Figure 36B:
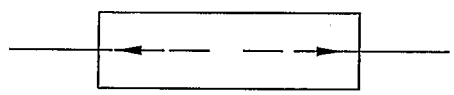
Figure 36C:
Figure 36D:
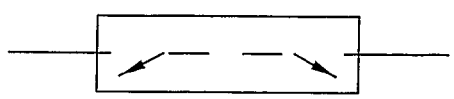

FIGS. 12 to 14 each show a different circular path for the rotating masses and the respective resultant force generated by the latter;

FIG. 15 shows the graphic construction of the maximum path followed by the rotating masses;

FIG. 16 shows the shape of the maximum and minimum paths that can be described by the rotating masses, as well as their geometrical construction;

FIG. 17 shows different paths of the rotating masses and the corresponding resultant forces generated thereby, as well as a first embodiment of the invention;

FIG. 18A shows a detail regarding the positioning of a rotating mass on an arm;

FIG. 18B shows two pairs of counter-rotating arms connected to a motor by means of a pin;

FIG. 18C shows two pairs of counter-rotating arms, corresponding to which are another two pairs of arms for balancing the moments;

FIG. 18D shows the forces of the individual masses for a pair of arms;

FIG. 18E shows a variant of FIG. 18C;

FIG. 19 shows the minimum distance that there must be between the pin and the rotating mass;

FIGS. 20A to 20C each show the variation of the distance between the pin and the axis of the rotating mass as the diameter of the latter varies;

FIGS. 21 and 22 show the path, respectively partial and total, described by the same rotating mass;

FIGS. 23A and 23B each show a different shape for the rotating arms;

FIG. 24 shows a detail of a variant of the invention;

FIGS. 25 to 27 show a second embodiment of the invention;

FIG. 28 shows a third embodiment of the invention;

FIG. 29 shows a multiplicity of rotating masses meshed with one and the same crown wheel;

FIG. 30 shows a multiplicity of masses, which rotate about a common axis;

FIG. 31 shows a further variant of the invention;

FIGS. 32A and 32B, respectively similar to FIGS. 18A and 18E, show the invention in the case where the shape of the masses enables the use of a single arm instead of a pair of arms FIGS. 33A to 33C show a further variant that enables the masses to describe the minimum path illustrated in FIG. 16;

FIGS. 34A to 34D show in sequence the directions of the forces of four impellers that enable movement of a vehicle that is initially stationary;

FIGS. 35A to 35H show in sequence the directions of the forces of the impellers of FIGS. 34A-34D that enable braking and stopping of a moving vehicle; and FIGS. 36A to 36D show the directions of the forces of four impellers that enable a vehicle to be raised or lowered.

The apparatus according to the present invention comprises at least one device constituted substantially by two pairs of rotating masses equal to and set alongside one another, in which the masses of each pair rotate synchronously and in opposite directions with respect to those of the adjacent pair, along two respective plane paths, which are identical and parallel to one another, having at least one axis of symmetry, and maintaining positions diametrally opposite to a common axis of rotation that is perpendicular to the paths themselves and that intersects them in a point of their axis of symmetry internal thereto.

From what has been said, it is evident that, according to the invention, the distance between each of the two masses of a pair and the corresponding axis of rotation varies with the position occupied by the mass along the asymmetrical path, and since the angular velocity of the two masses is the same, the value of the inertial acceleration that acts on the two masses is generally different, giving rise to inertial forces of a different magnitude that evidently have a resultant other than zero.

According to a peculiar characteristic of the invention, the presence of at least two parallel and counter-rotating adjacent pairs generates a global resultant of inertial forces directed in a single direction: the synchronized and counter-rotating movement of the two pairs of masses determines the formation of inertial forces on each of them, which, if broken down into their components, respectively parallel and perpendicular to the axis of symmetry of the paths, show how—instant by instant—the four components perpendicular thereto cancel out two by two, whilst the four components parallel thereto subtract two by two with a non-zero resultant directed always in one and the same direction.

From what has been said so far, it is evident that, even with a constant velocity of rotation of the masses, the magnitude of the resultant force is not constant in time, but has a value that varies with the components of the inertial forces parallel to the axis of symmetry, namely, according to the position of the masses themselves along the respective path.

In this connection, useful reference may be made to the attached figures.

FIGS. 1 to 10A, show the distribution of the inertial force generated by a device of the type so far described, for different paths that are followed, respectively in the two directions, by the rotating masses according to the present invention.

As may be seen, for a given angular velocity, the shape of the path described by the four masses of the device and its position with respect to the axis of rotation can give rise to forces of even very different magnitude.

In FIGS. 1 to 4, it may be noted that if the path has a substantially ovoid shape and is positioned almost centrally with respect to the axis of rotation, the inertial resultant force is negligible.

Figure 5:
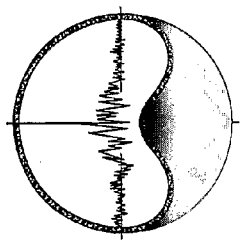
Figure 4:
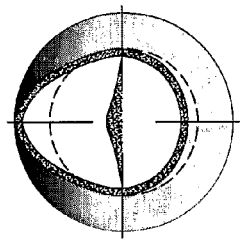
Figure 3:
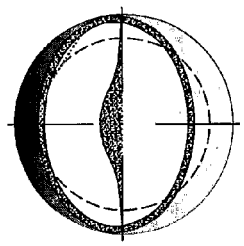
Figure 2:
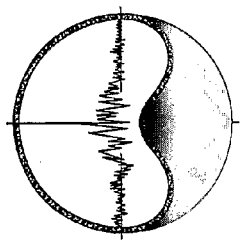
Figure 1:
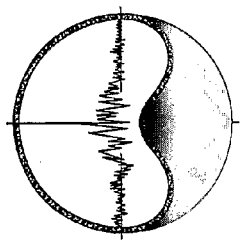

If the shape of the path, albeit having an axis of symmetry, has a shape such that its tangents intersect in two or more points, the masses cannot follow the path in a regular way because in some points they would tend to detach therefrom on account of the presence of components of the tangential velocity directed towards the inside of the path itself (FIG. 5).

Figure 6:
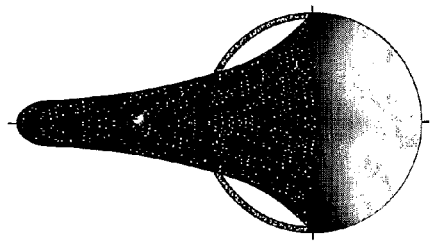
Figure 10E:
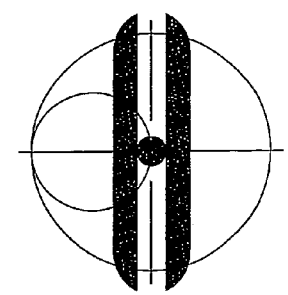
Figure 10D:
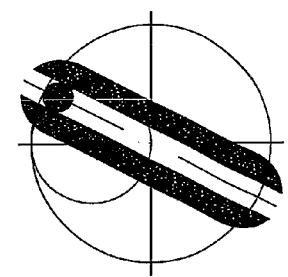
Figure 10H:
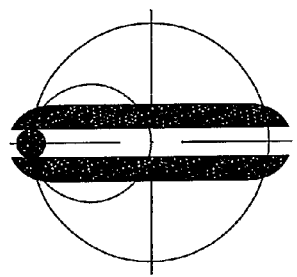
Figure 10C:
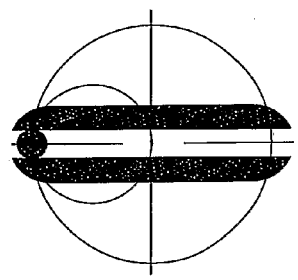
Figure 10G:
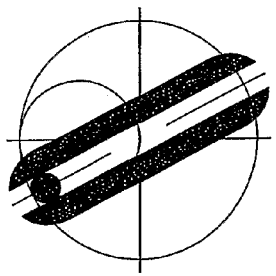
Figure 10B:
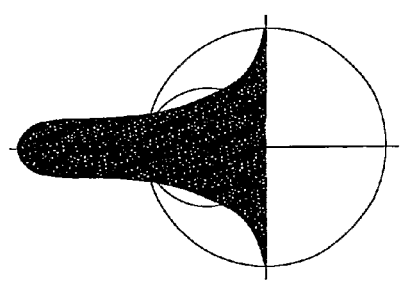
Figure 10F:
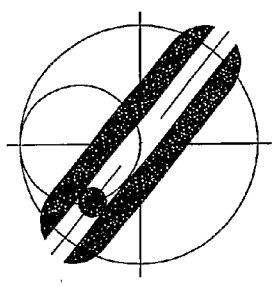

FIG. 6 shows a path substantially coinciding with a semi-circumference joined to its diameter, but said path is mechanically unrealizable from the practical standpoint in so far as the masses would be subject to extremely marked impact that in the passage from the arc of circumference to the diameter and vice versa would render the apparatus unserviceable.

Figure 7:
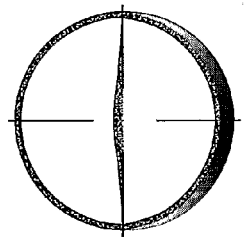

The path of FIG. 7, albeit overcoming the mechanical problems of the preceding case thanks to the presence of very rounded paths in the areas of passage from the semi-circumference to the diameter, does not yield a resultant force of sufficient magnitude.

The best results (FIGS. 8, 9, 10A) are obtained using paths that occupy only to a very limited extent the area under the centre of rotation.

Figure 9:
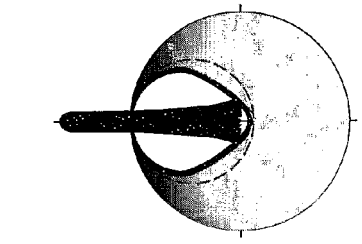

The simplest path that yields satisfactory results is constituted by a circumference, the diameter of which is slightly greater than the maximum distance reached by the masses with respect to their axis of rotation, said circumference passing through the point of maximum distance set on the previously described axis of symmetry and being positioned so as to have a diameter passing through the centre of rotation of the masses themselves (FIG. 9).

Figure 8:
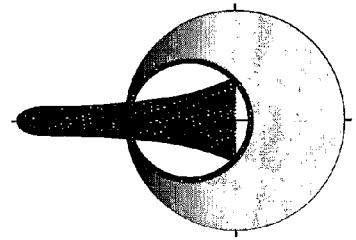

FIG. 8 shows an egg-shaped path, having the narrower end in the proximity of the centre of rotation of the masses, said path being inscribed in the circular path described above.

Figure 10A:
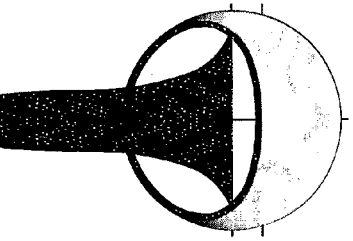
FIG. 10B shows the resultant force generated by a single mass that travels along a path tangential to the axis of rotation of the masses.
FIGS. 10C to 10H show the movements of a single mass along the path of FIG. 10B.

FIG. 10A, shows a path constituted by an ovoid that has a stretch in which the masses move, remaining constantly at the maximum distance from the centre of rotation and consequently giving rise to the maximum inertial force. Said configuration yields then the maximum values of global resultant force.

From the figures referred to and from what has been said so far, it is clear how the highest inertial forces are generated by the masses that move in the stretch of path furthest from the axis of rotation, and that said forces weaken with the approach of the stretch of path to said centre of rotation. Consequently, the value of the resultant of said forces of inertia varies cyclically in time, increasing and decreasing symmetrically with respect to the already mentioned axis of symmetry of the path itself.

In other words, at each revolution made by the masses an impulsive force is generated that is the more intense, the shorter it is: its magnitude, in fact, is proportional to the velocity of rotation, whilst the duration is inversely proportional thereto. Given that the device according to the invention generates forces of an intrinsically impulsive nature, in what follows reference will be made to the invention also using the term "impeller".

Figure 11:
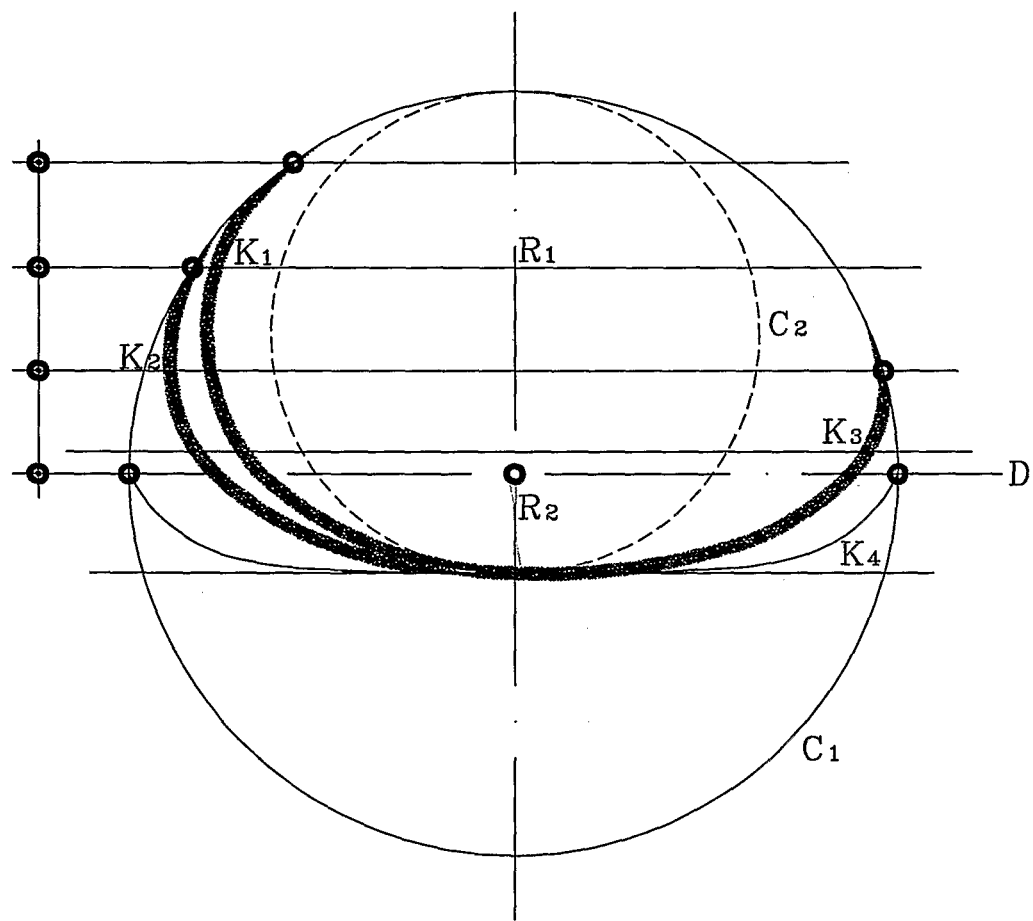
FIG. 11 shows a multiplicity of paths for the rotating masses, together with a circumference, the centre of which coincides with the centre of rotation of the masses.

FIG. 11 shows different types of paths K1, K2, K3, K4 for the rotating masses, together with the outer circumference C1, the centre of which coincides with the centre of rotation of the masses themselves, and has a radius equal to the maximum distance reached by the masses during their rotary motion. For simplicity of graphic representation, given their symmetry, only one half of each path has been represented.

According to the present invention, as may be seen clearly also from the aforesaid figures, the paths are always contained within the outer circumference C1 described above.

In the same figure, also represented by a dashed line is a circular path C2 (similar to that of FIG. 9), which has just one point in common with the outer circumference C1, namely, the point of maximum distance reached by the rotating masses that lie on the axis of symmetry common to all the paths.

With reference to FIGS. 12, 13 and 14, it is to be noted that the circular path, albeit not enabling the maximum power to be obtained, is particularly simple to produce and moreover limits any sharp changes in direction of the masses, so reducing the inevitable problems due to friction and wear.

It should be noted, however, that to obtain the best results, the position of the path with respect to the point of rotation is of primary importance: the value of the inertial resultant force is in fact proportional to the distance between the centre of the circular path C2 and the centre of rotation.

As may be seen once again from FIGS. 12, 13 and 14, the most advantageous paths are external to the circular path C2 and internal to the outer circumference C1. In particular, said paths have a top arc in common with the outer circumference C1, whilst the remaining, bottom, part has a variable radius of curvature so as to intersect the diameter of the circumference C1 perpendicular to the axis of symmetry in two symmetrical points external to the circular path C2.

According to the invention, the usable paths K can be formed using two arcs of circumference of equal diameter, an arc of circumference of diameter equal to that of the outer circumference C1, and a stretch of chord of the latter. With reference to FIG. 15, corresponding to the graphic construction of a path according to the present invention, it is to be noted that the path that the pairs of rotating masses so far described must follow can be defined in the way described hereinafter.

In a reference system with the origin in the centre of rotation of the masses and having the vertical axis coinciding with the axis of symmetry of the path of the masses themselves, it is possible to construct a generic path K by tracing two circumferences of radius $R_K \leqq \frac{3}{4} R1$, with its own centre on a radius inclined by 5° with respect to the horizontal diameter of the outer circumference C1 and tangential thereto at the end of said inclined radius, and by joining them with a horizontal chord tangential to said circumferences at the bottom.

Said generic path K is constituted, starting from beneath and proceeding in a counterclockwise direction: by the stretch of horizontal chord that joins the two points of tangency with the two lateral circumferences, by an arc of the right-hand minor circumference, by a top arc of the outer circumference C1, and by an arc of the left-hand minor circumference symmetrical to the first.

According to the invention, the points of radiusing between the lateral arcs of circumference and the top one are located preferably at the ends B and B' of the two inclined radii of the outer circumference C1, or else in points of the latter that are located in the first 5° to 15° from the horizontal, with an appropriate stretch of radiusing between the two lateral arcs of circumference and the top arc.

FIG. 16 shows more clearly the shape of the maximum path K just described.

The same figure moreover shows the shape of the minimum path that is defined by tracing a circumference C3 having a radius R3 that is equal to $\frac{1}{10}$ of R1 and a centre O' set on the axis of symmetry of the path of the masses. Said circumference C3 is tangential to the centre of the circumference C1 (FIG. 16).

All the paths symmetrical with respect to the vertical axis that are located within the maximum and minimum paths just described, are validly usable according to the invention, even though with resultant forces and/or frictions of an even very different magnitude.

In a variant of the invention, the lateral circumferences could have a smaller diameter, or else could be positioned with the respective centres on a horizontal chord located above the diameter of the outer circumference C1. In any case, obviously, the arcs usable of said circumferences vary in amplitude, and the bottom chord that joins them can also be reduced to a point on the axis of symmetry for lateral circumferences of larger radius, as shown by the path K appearing in FIG. 17.

At this point, reference should be made to the examples of embodiment of the invention.

A first example of embodiment of the invention, represented schematically in FIGS. 17, 18A and 18B, envisages that the rotating masses M are displaced along their own path K, constituted by a sort of track, by means of slotted arms 1, which rotate with respect to the axis of rotation of the masses M, defining, with their ends, the outer circumference C1 described above.

Said arms 1 are preferably shaped like a very elongated H and have two longitudinal slots S, one for each mass, designed to enable the masses to vary their distance from the centre of rotation during their displacement along the path K.

In the preferred embodiment that is described, each of the masses M is constituted by a sort of "handlebar" with a central wheel, said handlebar having its ends inserted in the slots of two mutually parallel and fixed arms 1, whilst the central wheel rolls along its own path with rolling friction. FIGS. 18A and 18B show clearly what has been described, together with the pair of arms 1 that move the second pair of masses associated to the first in opposite directions.

With reference to FIGS. 18C and 18D, it is to be noted that, on account of the albeit minimum distance between the two counter-rotating pairs of masses, moments are created that tend to cause the device to rotate about an axis perpendicular to that of rotation of the masses and consequently, in order to prevent vibrations, it is preferable to provide two devices set alongside one another, in which the adjacent pairs turn in one and the same direction, whilst the external ones both turn in opposite directions.

The two pairs of slotted arms or forks 1 are moved by respective motors, of a known type, that are synchronized with one another, or else by a motor and by an appropriate kinematic chain of transmission of motion.

FIG. 19 shows the minimum distance H between the end of the slot S and the pin P on which the slotted arms 1 rotate. According to the invention, said distance H must be the minimum necessary to guarantee the presence of a distance D of non-interference between the body of the rotating mass M and the pin for rotation of the rotating arms 1.

The value of the distance H depends upon the material used, upon the expansion and/or deformation of the materials, upon the velocity of rotation, as well as upon the encumbrance of the mass that must be made to rotate. In this connection, FIGS. 20A, 20B and 20C show three different minimum distances H1, H2 and H3 designed to guarantee the existence of a distance D of non-interference.

It should be noted that the path K followed by the mass shaped like a handlebar that travels along the track, rotating thereon, defines, for the longitudinal axis of symmetry of the handlebar, a path K' that is parallel to and inscribed in the path K. Consequently, the paths so far described can be defined also as locus of points occupied by the centre of the rotating masses instead of as track on which they move (FIGS. 21 and 22).

The rotating arms 1 provided with slots S, can present a shape different from what has so far been described. For example, it could envisage arms 1 constituted by disks provided with opposed slots S, within which the masses M slide during their displacement along the paths K, said disks also possibly envisaging holes for lightening, set symmetrically with respect to the centre of rotation (FIGS. 23A and 23B). The use of slotted disks obviously implies the presence of flywheel masses capable of regularizing advantageously the rotary motion of the entire device.

From what has been said so far, it is evident that, during rotation of the arms, the rotating masses M are kept adherent to their path or track thanks to the inertial forces. To prevent any impact during the step of starting, it is preferable for said masses M to be kept in the proximity of the track on which they move, by means of lateral supporting guides (FIG. 24). It is to be noted in fact that, on the hypothesis that the respective slotted arms 1 stop in the vertical position, the mass M that is located in the top slot S would be recalled towards the centre of rotation of the arm itself by the force of gravity, and at the subsequent starting would be thrust violently against the track, potentially causing damage.

It should be noted that the presence of the through pin P, on which the arms 1 are fitted, evidently prevents the rotating masses M from being able to follow paths passing through the axis of rotation of the pin P itself. In other words, the embodiment so far described does not enable the masses M to describe the minimum path C3 illustrated in FIG. 16 and passing through the centre of rotation O.

According to the present invention, said minimum path is instead obtained by means of a variant, in which the pin P is interrupted between the two arms 1 of each pair.

In this variant, the device comprises at least two pairs of parallel and counter-rotating arms 1, in the slot S of which just one rotating mass M slides (FIGS. 33A and 33B).

The mass M is guided along its path by a guide that keeps it in the correct position even with the device stationary (FIG. 33C).

In a second embodiment of the invention (illustrated schematically in FIGS. 25 to 27), as an alternative to the rotating masses M moved by the slotted arms 1 so far described, there are provided as many "micro-impellers", i.e., small devices based upon the same principle of operation so far described, each of which rotates not only about the pin P of the rotating arms 1, but also on itself. Said micro-impeller is provided with two lateral cylindrical elements (FIG. 26A) sharing the same axis of rotation as the micro-impeller itself, each of which is designed to come into contact with the internal surface of the track K that identifies the path along which the micro-impellers rotate.

Figure 26A:
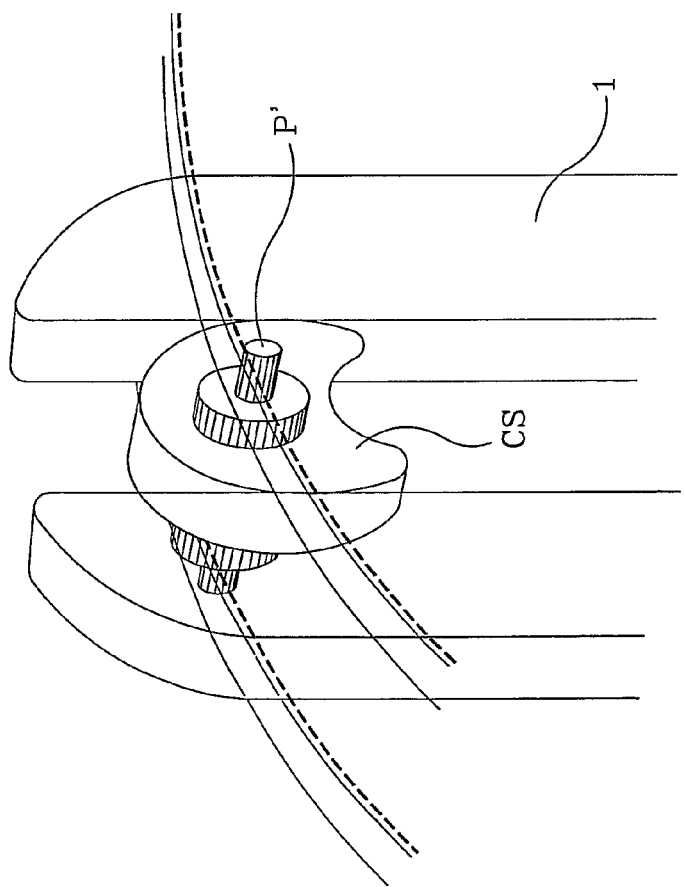
Figure 26B:
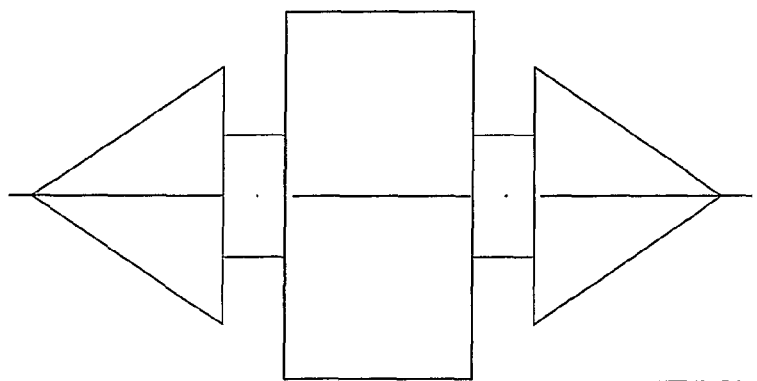
Figure 26C:
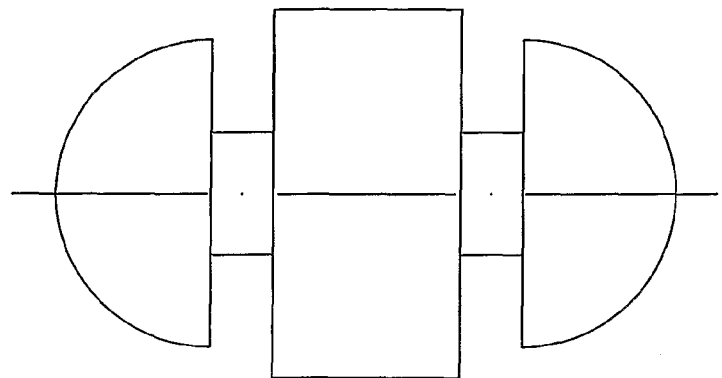
Figure 26D:
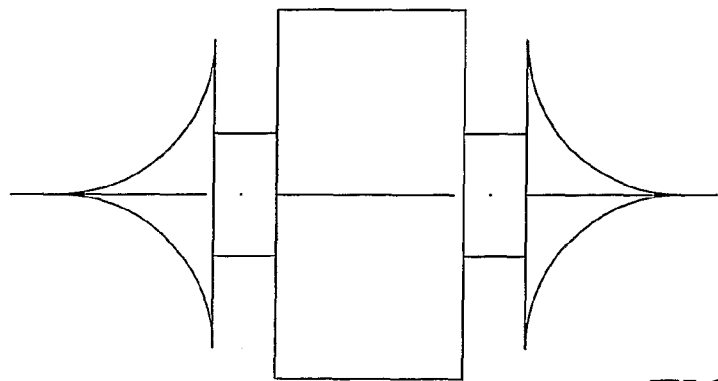

According to the invention, as an alternative to said lateral cylindrical elements there are provided lateral projecting elements having a conical-shape or the shape of a truncated cone (FIG. 26B), or else are crowned (FIG. 26C), or else cusp-shaped (FIG. 26D). In this way, by varying the lateral distance of the track K from the body of the micro-impeller there is imposed a variation of the distance between its axis of rotation and the track K itself. Evidently, this variation of distance causes, given the same displacement of the micro-impeller along the track, a variation of the angular velocity imposed on the micro-impeller on its own axis P'.

To improve the setting-in-rotation of the micro-impeller about its own axis P', it is preferable to equip the track K and the lateral projecting elements of each micro-impeller with an appropriate toothing so as to transform the track K into a rack.

According to a peculiar characteristic of the invention, the presence of said rack is necessary principally for two reasons: the first is to enable transmission of the motion of rotation to the micro-impellers without having to equip them with motors of their own; the second—not of lesser importance—is to guarantee development of resultant inertial forces directed in a radial direction with respect to the centre of rotation P, i.e., similar to the inertial forces generated by the rotating masses M described in the previous case.

The chief advantage of this second embodiment, which is constructionally more complicated, is that of generating much more intense inertial forces with masses that are as a whole decidedly smaller and with a number of revolutions of the main slotted arms 1 that is sensibly reduced.

It is to be noted that said micro-impellers, provided with slotted arms 1' that move small masses M' that can slide in the slots S' of said slotted arms 1', are installed on appropriate sliders CS, which slide along the slots S of the main rotating arms 1 so as to keep the micro-impellers themselves constantly meshed on the track K as its distance from the central pin P varies.

Also in this case, it is advantageous that said sliders should remain in continuous contact with the track K by purposely provided elastic means or lateral supporting guides, already described (FIG. 24), which guarantee meshing even with the device stationary and in the absence of inertial forces.

Also for this second embodiment, it is possible to use the single-mass configuration (i.e., with just one micro-impeller) and/or to combine the use of H-shaped arms 1 for moving the micro-impellers, within which a single mass is envisaged, with the arms 1' not joined by the pin P' for rotation, and vice versa (FIG. 31).

To return to FIG. 16, in order to define the equation of the useful paths according to the present invention, the following hypotheses are made:

$$R_1 = \text{radius } OB$$

$$R_2 = \text{radius } CB = \frac{3R_1}{4} = C'B'$$

$$R_3 = OO' = \frac{R_1}{10}$$

$$\alpha = 5°$$

$$\tau = \tan\alpha = 0.0875$$

Co-ordinated points:

$$O = (0,0)$$

$$C = \left(\frac{R_1}{4} \cdot \frac{1}{\sqrt{1+\tau^2}}, \frac{R_1}{4} \cdot \frac{\tau}{\sqrt{1+\tau^2}}\right)$$

-continued $$C' = \left(-\frac{R_1}{4} \cdot \frac{1}{\sqrt{1+\tau^2}}, \frac{R_1}{4} \cdot \frac{\tau}{\sqrt{1+\tau^2}}\right)$$

$$A = \left(\frac{R_1}{4} \cdot \frac{1}{\sqrt{1+\tau^2}}, \frac{R_1}{4} \cdot \left(\frac{\tau}{\sqrt{1+\tau^2}} - 3\right)\right)$$

$$A' = \left(-\frac{R_1}{4} \cdot \frac{1}{\sqrt{1+\tau^2}}, \frac{R_1}{4} \cdot \left(\frac{\tau}{\sqrt{1+\tau^2}} - 3\right)\right)$$

$$B = \left(R_1 \cdot \frac{1}{\sqrt{1+\tau^2}}, R_1 \cdot \frac{\tau}{\sqrt{1+\tau^2}}\right)$$

$$B' = \left(-R_1 \cdot \frac{1}{\sqrt{1+\tau^2}}, R_1 \cdot \frac{\tau}{\sqrt{1+\tau^2}}\right)$$

EQUATION OF THE CURVES
Segment A'A:

$$Y = \frac{R_1}{4} \cdot \left(\frac{\tau}{\sqrt{1+\tau^2}} - 3\right)$$

$$-\frac{R_1}{4} \cdot \frac{1}{\sqrt{1+\tau^2}} \leq x \leq \frac{R_1}{4} \cdot \frac{1}{\sqrt{1+\tau^2}}$$

Circumference BB':

$$Y = \sqrt{R_1^2 - x^2}$$

$$-R_1 \cdot \frac{1}{\sqrt{1+\tau^2}} \leq x \leq R_1 \cdot \frac{1}{\sqrt{1+\tau^2}}$$

Circumference AB:

$$x = \frac{R_1}{4} \cdot \frac{1}{\sqrt{1+\tau^2}} + \sqrt{\frac{9}{16}R_1^2 - \left(y - \frac{R_1}{4} \cdot \frac{\tau}{\sqrt{1+\tau^2}}\right)^2}$$

$$\frac{R_1}{4} \cdot \left(\frac{\tau}{\sqrt{1+\tau^2}} - 3\right) \leq y \leq R_1 \cdot \frac{\tau}{\sqrt{1+\tau^2}}$$

Circumference A'B':

$$x = -\frac{R_1}{4} \cdot \frac{1}{\sqrt{1+\tau^2}} - \sqrt{\frac{9}{16}R_1^2 - \left(y - \frac{R_1}{4} \cdot \frac{\tau}{\sqrt{1+\tau^2}}\right)^2}$$

$$\frac{R_1}{4} \cdot \left(\frac{\tau}{\sqrt{1+\tau^2}} - 3\right) \leq y \leq R_1 \cdot \frac{\tau}{\sqrt{1+\tau^2}}$$

Recurrent numerical values:

$$\frac{1}{\sqrt{1+\tau^2}} = 0.9962$$

$$\frac{\tau}{\sqrt{1+\tau^2}} = 0.0871$$

Applying said principle further, a third embodiment of the invention enables production, albeit with evident structural and constructional complications, of the micro-impellers with rotating arms 1', which in turn have further micro-impellers (provided with rotating arms 1") substituting the rotating masses M' and further increasing the magnitude of the inertial forces generated. This enables a further reduction in the number of revolutions and the magnitude of the rotating masses. Such a configuration is illustrated schematically in FIG. 28.

Once again according to the invention, it is advantageously possible to combine together two or more of the devices described above in order to be able to exploit the magnitude of the inertial forces developed by each of them.

A first example of said combinations is illustrated in FIG. 29, where a number of impellers (for example four) are directed with the respective axes of symmetry parallel to one another and draw motion from one and the same crown wheel, via which the synchronism of the movements and hence the unidirectionality between the resultant forces of each apparatus is guaranteed.

Another configuration, illustrated in FIG. 30, envisages a battery of impellers set alongside one another in such a way that the two pairs of masses of each device turn about a common axis. The drawing shows, for example, that the common axis turns on itself in a horizontal plane. In this way, it is advantageously possible to transmit rotary motion to this axis by equipping it with end gears, of which at least one is fitted thereon, said gears meshing on a fixed crown wheel (not shown).

Advantageously, said configuration also enables provision of a series of impellers, in which the movements of the respective masses are staggered in such a way that each impeller generates its own impulsive force at different times, supplying an overall thrust that, albeit of lower intensity, is characterized by a greater regularity and continuity over time.

At this point, it should be noted that an interesting mechanical simplification can be obtained using rotating masses M, constituted, for example, by two parallel disks joined by a central axle, which is designed to slide within a single arm 1 (FIG. 32A and FIG. 32B). It is in this case clear that the masses M just described are set in rotation by just one arm instead of by a pair of arms 1, this fact enabling the production of devices that are more compact and hence present lower encumbrance.

According to the invention, it is possible to envisage a number of devices or "impellers" of the type so far described, which are combined together in one and the same vehicle, for example at the four corners thereof, and are directional independently of one another to obtain a zero resultant or else a force other than zero for making displacements, for changing direction, or for braking the vehicle.

FIGS. 34A-34D show, in sequence, how the four impellers must be directed to cause a vehicle that is initially stationary to advance, whilst FIGS. 35A-35H show, in a different sequence, how the same impellers must be directed for braking and stopping a vehicle initially in motion.

It is particularly useful to note that, according to the invention, the friction with the ground (wheels or the like) or with the air (for example propellers, etc.) is not absolutely necessary for imposing motion, for changing the direction or for braking.

Finally, FIGS. 36A-36D also show different possible directions for the impellers with respect to the horizontal plane to raise the vehicle or to "push" it downwards. In this way, it is possible to use the vehicle as means of displacement on the Moon, on Mars or in space.

The invention claimed is:

1. An apparatus for developing inertial forces, the resultant of which is a unidirectional force, said apparatus comprising:
   first and second masses (M),
   said first mass (M) rotating in a first direction on a generic plane and along a closed first path parallel and adjacent to a closed second path of said second mass moving in a second direction opposite the first direction,
   the first and second paths being symmetrical with respect to a vertical axis coinciding with the axis of symmetry of the paths of said masses (M),
   said first and second path being comprised between a minimum path and a maximum path,
   both said minimum path and said maximum path comprised in an outer circumference (C1) having a radius (R1) and a diameter (D1) that is perpendicular to the axis of symmetry of the path of the first and second masses (M), as well as a centre (O) that coincides with the centre of rotation of the first and second masses (M),
   said minimum path being defined by a circumference (C3) having a radius (R3) equal to ¹⁄₁₀ of the radius (R1) and a centre (O') set on the axis of symmetry of the path of the first and second masses and tangential to the centre of the circumference (C1),
   said maximum path being defined by left-hand and right-hand minor circumferences of radius $(R_K) \leq \frac{3}{4}(R1)$, each minor circumference of radius having a centre on the diameter (D1) of the circumference (C1) and being tangential thereto at the end of the circumference, by joining i) a stretch of horizontal chord that joins the two points of tangency with ii) the two minor circumferences, an arc of the right-hand minor circumference, a top arc of the circumference (C1), and an arc of the left-hand minor circumference,
   wherein said arc of the left-hand minor circumference is symmetrical to the arc of the right-hand minor circumference, and
   motors, synchronized with one another, arranged to provide movement to said first and second masses (M).

2. The apparatus according to claim 1, further comprising at least one slotted arm (1) having ends and rotating about a pin (P), the slotted arm displacing each of said rotating first and second masses (M) along a path K of their own, which path rotate with respect to the pin (P) coaxial to the axis of rotation of the first and second masses (M), defining, with the ends of the slotted arm, said outer circumference (C1).

3. The apparatus according to claim 2, wherein said arms are shaped as an elongated H and have two longitudinal slots (S) set radially, one slot for each mass (M), designed to enable the masses to vary their distance from the centre of rotation during their displacement along the path K.

4. The apparatus according to claim 3, wherein between each rotating mass (M) and the pin (P), on which the slotted arms (1) rotate, there exists a distance (D) preventing any mechanical interference.

5. The apparatus according to claim 3, wherein, in order to prevent any impact during the step of starting, said masses (M) are, against the path on which they move, by an elastic means.

6. The apparatus according to claim 3, wherein said arms (1) are in pairs and each mass (M) has a handlebar shape with a central wheel, said handlebar shape having ends inserted in the slots (S) of two mutually parallel and fixed arms (1), whilst the central wheel rolls along its own path with rolling friction.

7. The apparatus according to claim 6, wherein the path K followed by the mass (M) defines, for the axis of rotation of the mass (M), a path K' that is parallel to and inscribed in the path K; said paths being the locus of points occupied by the centre of the rotating masses (M).

8. The apparatus according to claim 6, wherein between each rotating mass (M) and the pin (P), on which the slotted arms (1) rotate, there exists a distance (D) preventing any mechanical interference.

9. The apparatus according to claim 2, wherein between each rotating mass (M) and the pin (P), on which the slotted arms (1) rotate, there exists a distance (D) preventing any mechanical interference.

10. The apparatus according to claim 2, wherein said slotted arms (1) are constituted by disks provided with opposed radial slots (S), within which slots the masses (M) slide during their displacement along the paths K; said disks having holes for lightening, set symmetrically with respect to the centre of rotation.

11. The apparatus according to claim 2, wherein, in order to prevent any impact during the step of starting, said masses (M) are pushed, against the path on which they move, by an elastic means.

12. The apparatus according to claim 1, wherein, in order to prevent any impact during the step of starting, said masses (M) are pushed against the path K on which they move, by an elastic means.

13. The apparatus according to claim 1, further comprising at least micro-impeller rotating about a pin (P), the micro-impellor displacing each of said rotating first and second masses (M) along a path K of their own, which path rotate with respect to the pin (P) coaxial to the axis of rotation of the first and second masses (M), and defining said outer circumference (C1).

14. The apparatus according to claim 13, wherein each micro-impeller is provided with two lateral projecting elements sharing the same axis of rotation (P'), each projecting element designed to come into contact with the internal surface of a track that identifies path K along which said micro-impellers turn.

15. The apparatus according to claim 14, wherein said lateral projecting elements have a conical shape or the shape of a truncated cone, or are crowned or cusp-shaped, thus obtaining that, by varying the lateral distance of the path K from the body of the micro-impeller, there is imposed a variation of the distance between its axis of rotation and the path K itself.

16. The apparatus according to claim 14, wherein, in order to improve the setting-in-rotation of the micro-impeller about its own axis (P'), the path K and the lateral projecting elements of each micro-impeller are provided with toothing so as to transform the path K into a rack.

17. The apparatus according to claim 14, wherein each of said micro-impellers is provided with slotted arms (1'), which move small masses (M') that can slide in slots (S') of said slotted arms (1'), and is installed on a purposely provided slider (CS), which slides along the slots (S) of the main rotating arms (1) so as to keep the micro-impeller itself constantly meshed on the path K as its distance from the central pin (P) varies.

18. The apparatus according to claim 1, wherein the maximum path is constituted by the sum of a segment (AA') and a plurality of arcs (A'B', B'B, BA), where:

$$A = \left( \frac{R_1}{4} \cdot \frac{1}{\sqrt{1+\tau^2}}, \frac{R_1}{4} \cdot \left( \frac{\tau}{\sqrt{1+\tau^2}} - 3 \right) \right)$$

$$A' = \left( -\frac{R_1}{4} \cdot \frac{1}{\sqrt{1+\tau^2}}, \frac{R_1}{4} \cdot \left( \frac{\tau}{\sqrt{1+\tau^2}} - 3 \right) \right)$$

-continued $$B = \left( R_1 \cdot \frac{1}{\sqrt{1+\tau^2}}, R_1 \cdot \frac{\tau}{\sqrt{1+\tau^2}} \right)$$

$$B' = \left( -R_1 \cdot \frac{1}{\sqrt{1+\tau^2}}, R_1 \cdot \frac{\tau}{\sqrt{1+\tau^2}} \right)$$

EQUATION OF THE CURVES
Segment A'A:

$$Y = \frac{R_1}{4} \cdot \left( \frac{\tau}{\sqrt{1+\tau^2}} - 3 \right)$$

$$-\frac{R_1}{4} \cdot \frac{1}{\sqrt{1+\tau^2}} \le x \le \frac{R_1}{4} \cdot \frac{1}{\sqrt{1+\tau^2}}$$

Circumference BB':

$$Y = \sqrt{R_1^2 - x^2}$$

$$-R_1 \cdot \frac{1}{\sqrt{1+\tau^2}} \le x \le R_1 \cdot \frac{1}{\sqrt{1+\tau^2}}$$

Circumference AB:

$$x = \frac{R_1}{4} \cdot \frac{1}{\sqrt{1+\tau^2}} + \sqrt{\frac{9}{16}R_1^2 - \left( y - \frac{R_1}{4} \cdot \frac{\tau}{\sqrt{1+\tau^2}} \right)^2}$$

$$\frac{R_1}{4} \cdot \left( \frac{\tau}{\sqrt{1+\tau^2}} - 3 \right) \le y \le R_1 \cdot \frac{\tau}{\sqrt{1+\tau^2}}$$

Circumference A'B':

$$x = -\frac{R_1}{4} \cdot \frac{1}{\sqrt{1+\tau^2}} - \sqrt{\frac{9}{16}R_1^2 - \left( y - \frac{R_1}{4} \cdot \frac{\tau}{\sqrt{1+\tau^2}} \right)^2}$$

$$\frac{R_1}{4} \cdot \left( \frac{\tau}{\sqrt{1+\tau^2}} - 3 \right) \le y \le R_1 \cdot \frac{\tau}{\sqrt{1+\tau^2}}$$

19. The apparatus of claim 1, wherein each of said masses (M) comprises a pair of masses (M).

20. An apparatus for developing inertial forces, the resultant of which is a unidirectional force, said apparatus comprising:
plural sets of first and second masses (M),
plural slotted arms (1), each slotted arm having ends and rotating about a pin (P), each slotted arm displacing a set of said rotating first and second masses (M) along a respective path K of their own, which path rotates with respect to the pin (P) coaxial to the axis of rotation of the first and second masses (M), defining, with the ends of the slotted arm, said outer circumference (C1),
said slotted arms being shaped as an elongated H and have two longitudinal slots (S) set radially, one slot for each of said first and second masses (M), and allowing the masses to vary their distance from the center of rotation during their displacement along the path K,
plural motors synchronized with one another, wherein said slotted arms are moved by respective ones of the plural motors synchronized with one another, said first mass (M) rotatable in a first direction on a generic plane and along a closed first path parallel and adjacent to a closed second path of said second mass moving in a second direction opposite the first direction, the first and second paths being symmetrical with respect to a vertical axis coinciding with the axis of symmetry of the paths of said masses (M), said first and second path being comprised between a minimum path and a maximum path, both said minimum path and said maximum path comprised in an outer circumference (C1) having a radius (R1) and a diameter (D1) that is perpendicular to the axis of symmetry of the path of the first and second masses (M), as well as a centre (O) that coincides with the centre of rotation of the first and second masses (M), said minimum path being defined by a circumference (C3) having a radius (R3) equal to $\frac{1}{10}$ of the radius (R1) and a centre (O') set on the axis of symmetry of the path of the first and second masses and tangential to the centre of the circumference (C1), said maximum path being defined by left-hand and right-hand minor circumferences of radius $(R_K) \leq \frac{3}{4}(R1)$, each minor circumference of radius having a centre on the diameter (D1) of the circumference (C1) and being tangential thereto at the end of the circumference, by joining i) a stretch of horizontal chord that joins the two points of tangency with ii) the two minor circumferences, an arc of the right-hand minor circumference, a top arc of the circumference (C1), and an arc of the left-hand minor circumference, wherein said arc of the left-hand minor circumference is symmetrical to the arc of the right-hand minor circumference.

* * * * *

UNITED STATES PATENT AND TRADEMARK OFFICE
CERTIFICATE OF CORRECTION

PATENT NO.       : 8,434,379 B2
APPLICATION NO.  : 12/374102
DATED            : May 7, 2013
INVENTOR(S)      : Antonio Romano Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this
Eighth Day of September, 2015

Michelle K. Lee
*Director of the United States Patent and Trademark Office*